(12) United States Patent
Fukuzawa et al.

(10) Patent No.: US 7,987,265 B2
(45) Date of Patent: Jul. 26, 2011

(54) AGGREGATION SYSTEM

(75) Inventors: Takashige Fukuzawa, Tokyo (JP); Yutaka Hiruma, Tokyo (JP); Koji Arakaki, Tokyo (JP); Tatsuharu Mishina, Tokyo (JP)

(73) Assignee: Eath Co., Ltd., Tokyo (JP)

( * ) Notice: Subject to any disclaimer, the term of this patent is extended or adjusted under 35 U.S.C. 154(b) by 0 days.

(21) Appl. No.: 12/155,044

(22) Filed: May 29, 2008

(65) Prior Publication Data

US 2008/0235377 A1 Sep. 25, 2008

Related U.S. Application Data

(63) Continuation of application No. 10/553,422, filed on Oct. 18, 2005, now Pat. No. 7,430,603.

(30) Foreign Application Priority Data

Nov. 10, 2003 (JP) .................................. 2003-379466
Nov. 10, 2003 (JP) .................................. 2003-379467

(51) Int. Cl.
*G06F 15/173* (2006.01)

(52) U.S. Cl. .................. 709/225; 709/227; 709/228

(58) Field of Classification Search .................. 709/225, 709/227–228
See application file for complete search history.

(56) References Cited

U.S. PATENT DOCUMENTS

| | | | | |
|---|---|---|---|---|
| 6,587,866 | B1 * | 7/2003 | Modi et al. ..................... | 718/105 |
| 7,143,169 | B1 * | 11/2006 | Champagne et al. ......... | 709/226 |
| 7,228,349 | B2 * | 6/2007 | Barone et al. ................. | 709/225 |
| 7,379,988 | B2 * | 5/2008 | Bish et al. ...................... | 709/223 |
| 7,769,868 | B2 * | 8/2010 | Mishra et al. ................. | 709/227 |
| 7,774,473 | B2 * | 8/2010 | Elving et al. .................. | 709/227 |
| 7,860,975 | B2 * | 12/2010 | Elving et al. .................. | 709/227 |

FOREIGN PATENT DOCUMENTS

JP  2003256392  *  9/2003

* cited by examiner

*Primary Examiner* — Yves Dalencourt
*Assistant Examiner* — Michael C Lai
(74) *Attorney, Agent, or Firm* — Manabu Kanesaka

(57) ABSTRACT

An aggregation system includes: a load balancer for distributing accesses to a plurality of user proxy server devices, the accesses including operation information and ID numbers; a plurality of user proxy server devices, wherein the user proxy server devices include program device for identifying a user management server device where a user management server device number corresponds to a remainder M based on the remainder M obtained by dividing the ID number by a number N of the user management server devices, and for transferring the accesses to an identified user management server device; and a plurality of user administration server devices. The user administration server devices include computers sequentially assigned with the user management server device number, and program devices for functioning as a memory device and as a user management device for memorizing the operation information together with elapse time information.

2 Claims, 39 Drawing Sheets

Registration node (Below, move to the processing during operation)

AGGREGATION SYSTEM

CROSS REFERENCE TO RELATED APPLICATION

This is a continuation application of patent application Ser. No. 10/553,422 filed on Oct. 18, 2005, now U.S. Pat. No. 7,430,630.

BACKGROUND OF THE INVENTION AND RELATED ART STATEMENT

The present invention relates to an aggregation system, and relates in particular to an aggregation system that can order by aggregating at high speed through a communications network such as the Internet the information that is operated by multiple users in a short period of time.

To date, systems that aggregate the voting information, etc., operated by viewers (users) in conjunction with viewer participation programs for television and reflect this in the program, have been proposed. For example, Patent Document 1 noted below discloses a system that collects the voting information of viewers through the Internet by means of a WWW server.

Patent Document 1: Japanese Patent Publication No. 2002-344928

Conventional WWW server systems like that described in the aforementioned document are composed for example of a load balancer, http server, RDB server, etc. However, there are the following problems with making these apparatuses high-speed apparatuses.

In a layer 7 load balancer (loaded with a session control function), there has been a limit to the speed in decoding the application protocol for transferring the same user to the same http server, or for processing that specifies a http server while searching for the past information that is being retained. In addition, there has also been the problem that a proportionate expansion of equipment is not possible in order to carry out load distribution based on the user information that is retained.

The limits on performance due to the parallel deployment of http servers (loaded with a session control function and table cache function) depend on RDB. There has been the problem that compatibility with the other http servers arranged in parallel is not achieved if the same user does not process with the same http server. The reason is that this is cached so that a load is not exerted on the RDB server.

Given that the RDB server is RDB, it is not possible to strengthen performance in proportion to the cost, and there has been the problem that it is not possible to respond to concentrated access even if an extremely high cost system is used.

In addition, in conventional systems like those described above, in the event, for example, that an ordering is attempted in the order of the users who send the correct answer operation earliest, based for example on the operation information of the responses to a quiz sent by a user, ordering processing is carried out for all the user information in the WWW server, but in the event that a plurality of WWW servers is set up in order to make the processing high-speed, it is necessary to carry out the ordering processing by collecting the operation information, etc. of the users in one server, and to distribute the results to a plurality of WWW servers.

However, the amount of data to be forwarded becomes large when all the user data is solely collected from each WWW server, or the order result data is distributed, and in addition the load of the processing for ordering by integrating the collected data, or for reflecting the ordered information in the user data in each WWW server, becomes large, and there is thus the problem that time is required until the results appear. The purpose of the present invention is to solve conventional problems like those described above.

Further objects and advantages of the invention will be apparent from the following description of the invention.

SUMMARY OF INVENTION

The present invention gives a special ID number to the user, and includes this ID number in the operation information from the user. Then, its most important feature is that it enables a high-speed connection to a specified user administration server, due to the fact that the user proxy server that is assigned optionally to calls designates the user administration server based on a calculation from this ID number. In addition, it is further characterized by the fact that in the user administration server, the user information that has been recorded by a calculation from this number is accessed at high speed without a time-consuming search being done, and the user data is updated based on the operation information.

In addition, it is characterized by the fact that the information that is calculated from a plurality of user administration servers for each user, for example head-count data that corresponds to the score information for elapsed time, etc., from the start of access reception, is stored in special passing sequence data. In addition, the passing sequence data is collected in the prescribed ranking server, and the head-count corresponding to the score information is calculated by the entire system by additive synthesis. In addition, disaggregation of the passing sequence data is possible by a constant rule, and additive synthesis becomes possible with a plurality of servers in the event it is disaggregated, and it is possible to raise performance. Moreover, it is characterized by the fact that the head-count of the passing sequence data that is additively synthesized is converted into an order.

The following effects are obtained by the constitution of the present invention. According to the constitution of the present invention, it is not necessary to transfer the same user to the same user proxy server in the load balancer, so it is possible to assign in order packets to an optional user proxy server in the order in which they arrive at the layer 3 level, and high-speed processing is possible since there is no need for decoding or determining the information storage or application protocol for the purpose of dispersal, and expansion is possible optionally.

As far as the user proxy server is concerned, the ID numbers of the users are divided by the number of user administration servers, and the user administration server that is storing the user information can be designated for the remainder thereof, so there is no need to search, and high-speed relay forwarding of information can be done. As for the user administration server, the information of users is stored in the position of a sequence that takes as the index the quotient obtained by dividing the IDs of the users by the number of user administration servers, so there is no need to search, and it is possible to reference and rewrite user information at high speed.

In addition, according to the constitution of the present invention, the special passing sequence data is used for collection/distribution of the user information data that is processed by dispersing it by means of a plurality of user administration servers. Since this passing sequence data is composed only of units of head-count data that correspond to the score information for which data exists, the amount of data forwarded between servers decreases, and the processing/forwarding time is shortened.

In addition, since the passing sequence data is simultaneously produced by a plurality of user administration servers, and since in addition processing that imparts order information to the user information from the delivered sequence is processed by dispersal simultaneously by a plurality of user administration servers, the processing is done at high speed. Moreover, it is possible to do processing by dispersal simultaneously by means of a plurality of user administration servers for the synthetic processing of a plurality of passing sequences as well. Owing to this, there is no need to collect the user data that is dispersed in a plurality of user administration servers in one place and to carry out sort processing, and the order can be calculated at high speed.

In addition, in the constitution of the present invention, the user administration servers operate at the maximum high speed, and they store the user information or the operation information in the memory, but due to the fact that RDB, etc. is used for the storage method, effects are obtained such that a system that can easily increase processing ability can be developed while ensuring the same functions as existing WWW/RDB systems, etc., for which durability is required, and safety.

Therefore, effects are obtained such that the system for the present invention can aggregate the response processing or processing of rankings, etc. by ordering even when a large volume of calls are concentrated in a short period, and moreover it is possible to increase processing ability easily by increasing the number of user administration servers in accordance with need.

DETAILED DESCRIPTION OF THE PREFERRED EMBODIMENTS

There is disclosed below an embodiment of an order imparting system that can aggregate at high speed the information operated by a viewer in conjunction with a television program through the Internet, and carry out the ordering thereof.

Embodiment 1

Figure 1:
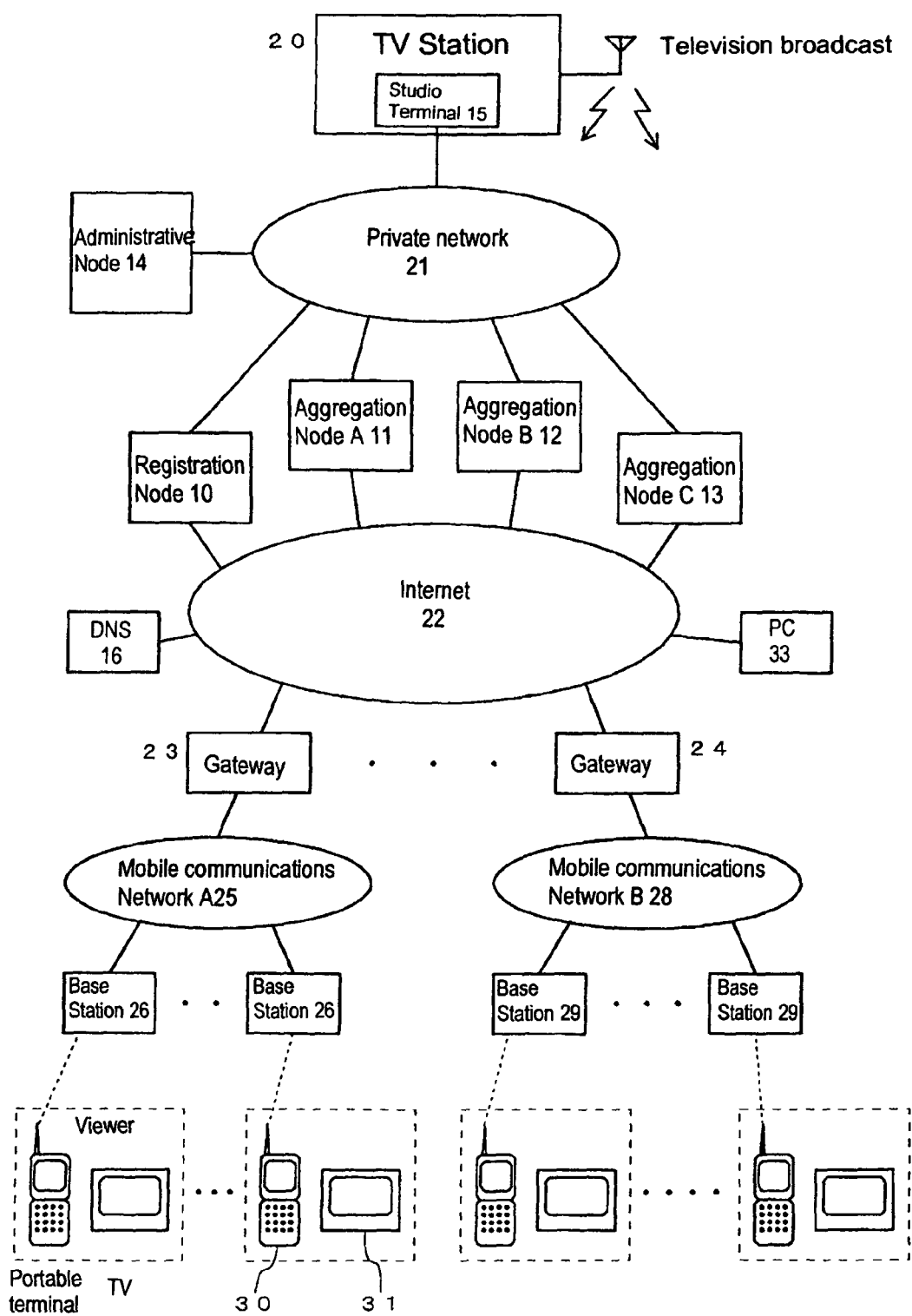
FIG. 1 is a block diagram that shows the composition of the entire system of an embodiment of the present invention.

FIG. 1 is a block diagram that shows the composition of the entire system of an embodiment of the present invention. The Internet 22 is connected with a plurality of mobile communication networks A25 and B28 through gateways 23 and 24, and the portable terminal 30 can be connected to the Internet through the base stations 26 and 29. A DNS (domain name server) 16 and a PC terminal 33 are also connected to the Internet. Such a constitution is well known. While the users (viewers) watch on the television 31 a television program that is sent from a television station 20, they access the aggregation system of the present invention by using portable terminals 30.

The registration node 10 and three aggregation nodes A11, B12 and C13 of the present invention are connected to the Internet 22. These nodes are also connected to a private network (hereinafter, "PN") 21. The administrative node 14 and the studio terminal 15 of the present invention are also connected to the PN 21. The PN 21 may be composed of a private line, etc., or a VPN (virtual private network) may be set up in the Internet 22. Moreover, one may also connect all the apparatuses via the Internet without providing a PN 21.

There may be a minimum of one aggregation node, but as shown in FIG. 1 the program can continue based on the data from another aggregation node even if the line that is connected to one aggregation node converges or is down, owing to the fact that the calls (viz., accesses) are dispersed by dispersing them through other nodes.

Figure 2:
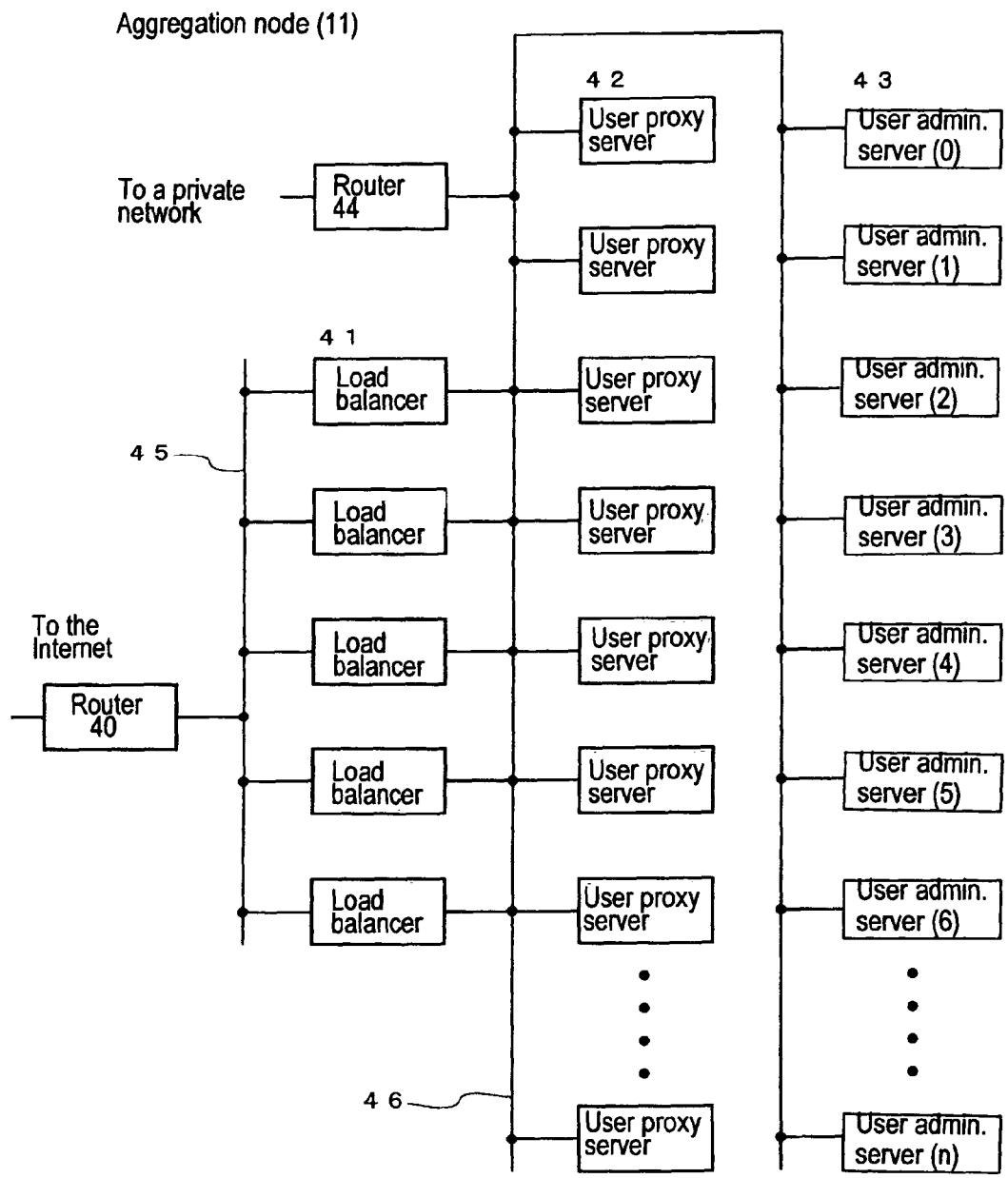
FIG. 2 is a block diagram that shows the composition of the aggregation nodes 11 to 13 of the present invention.

FIG. 2 is a block diagram that shows the composition of the aggregation nodes 11 to 13 of the present invention. Different IP addresses have been set up respectively for the plurality of load balancers 41 that are connected with the Internet 22 through a router 40 and a LAN 45, and the calls (accesses) are dispersed and arrive due to the functioning of the well-known DNS 16. The respective load balancers 41 select in order one out of the plurality of user proxy servers 42 and forward the calls or accesses, in the order in which they arrive.

The user proxy server 42 that is connected with the load balancers 41 through the LAN 46 carries out the processing described below, and carries out conversion of the forms, the specification of the user administration server 43 and the forwarding of and response to calls. The various kinds of servers used in the present invention can be realized by creating and installing the programs of the present invention that are described below in server apparatuses available on the market.

Figure 3:
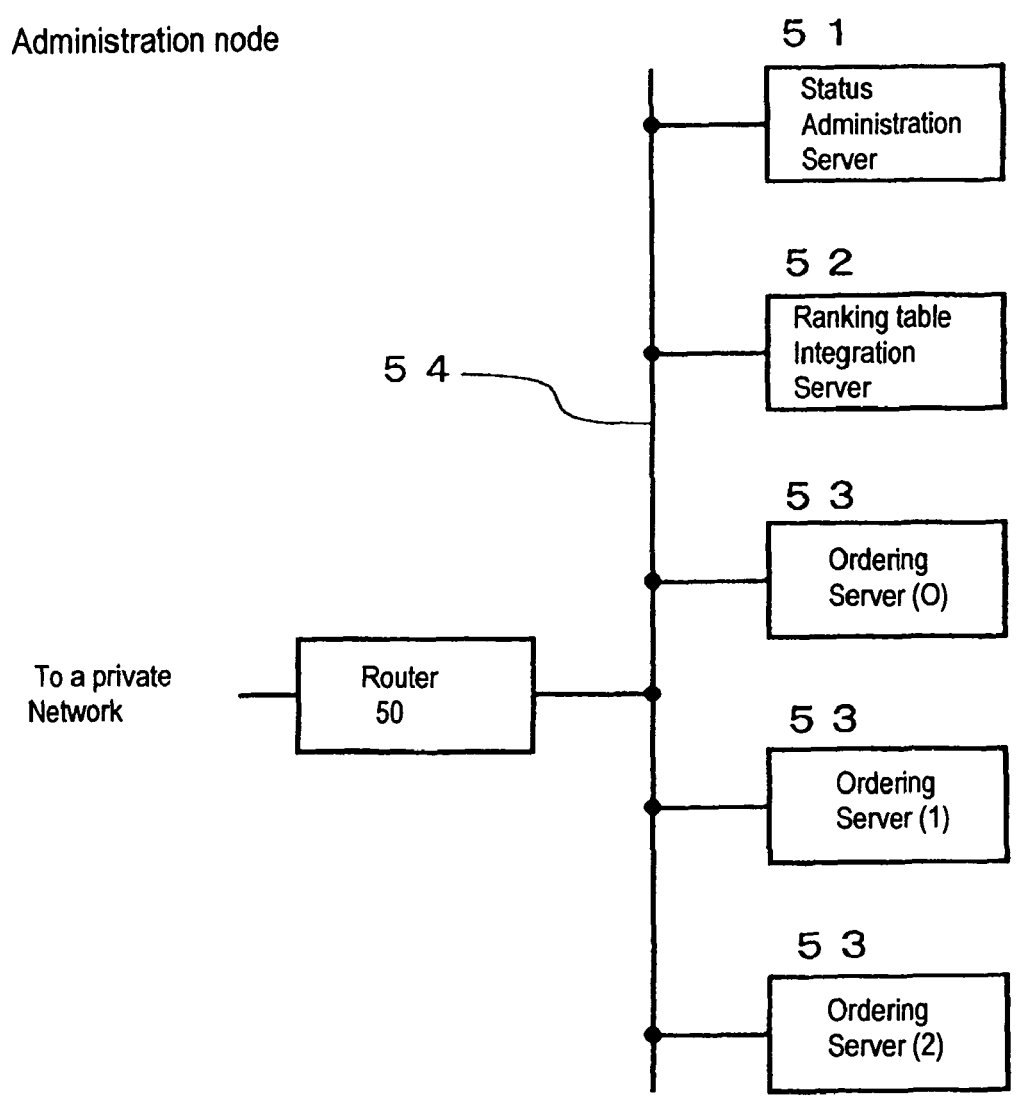
FIG. 3 is a block diagram that shows the composition of the administrative and registration nodes.
Figure 3:
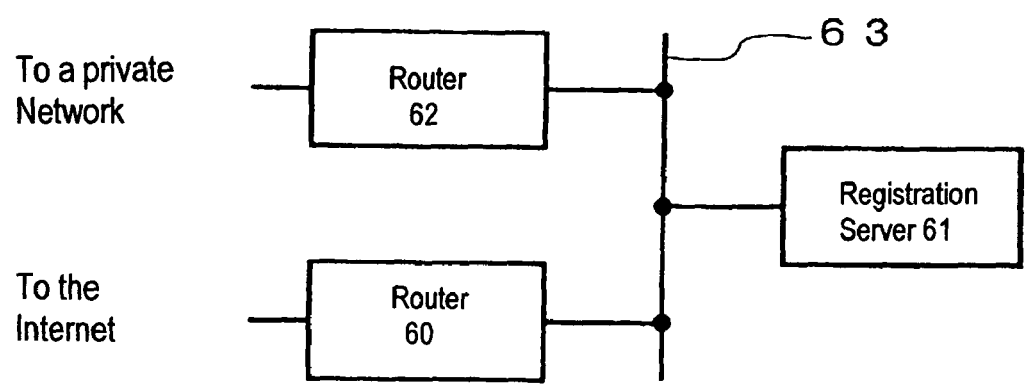

FIG. 3 is a block diagram that shows the composition of the administrative and registration nodes. FIG. 3(a) is a block diagram that shows the composition of the administrative node. A status administration server 51, which administers the processing state of the system overall, an ordering server 53, which receives the aggregate data from the user administration servers 43 of the aggregation node and imparts an order to it, and a ranking table integration server 52, which receives specific (for example, top rank) order data from the user administration servers 43, and produces the ranking table required for the program, are installed at the administration node 14. FIG. 3(b) is a block diagram that shows the composition of the registration node, and a registration server has been installed. One may also integrate the administration server, registration server, and aggregation server and install them in one place.

Figure 4:
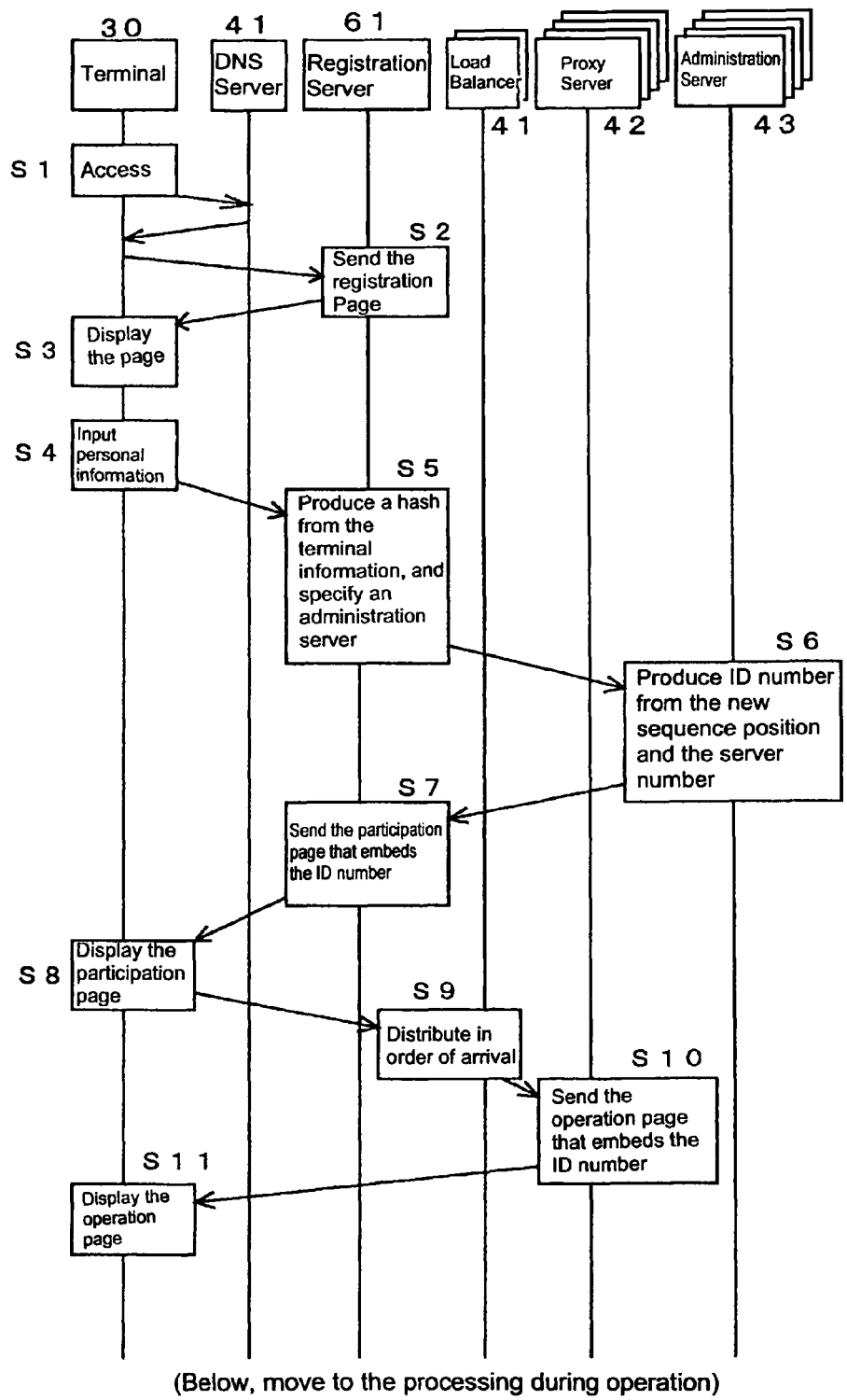
FIG. 4 is Flow Chart 1, which shows the exchange of processing between each apparatus of the present invention.

FIG. 4 is Flow Chart 1, which shows the exchange of processing between each apparatus of the present invention. This flow chart shows the registration processing and the participation preparation processing. The user starts up the browser of the terminal 30 to access the registration server 61 (S1). The registration server 61 returns the registration page (S2), and this is displayed at the terminal (S3). The user inputs personal information such as name and address (S4).

When the registration server 61 receives the personal information, the hash code (the value that is dispersed randomly) the character string that serves as the key (address, name, age or unique user identifier obtained from the mobile communication network) is divided, and the aggregate node to be stored is selected. The hash code h of the character string is calculated for example by the following method.

$$h = s[0]*31^{(n-1)} + s[1]*31^{(n-2)} + \ldots + s[n-1]$$

Here, s stands for the letter code for number i of the character string, n for the length of the character string, and ^ for the exponential power. Assuming that the same number (code) is assigned to the same character string, it may be a value that is distributed consciously (so that for example an aggregate node for Hokkaido is selected for a user in Hokkaido).

Next, the user administration server is designated by the remainder obtained by dividing this hash value by the number of user administration servers inside the aggregation node to be connected. This processing is done in order that the same user is invariably connected to the same user administration server, and registration cannot be done multiple times, and in addition in order that the calls are distributed evenly to a plurality of user administration servers. The registration server 61 forwards the registration information to the user administration server 43 (S5).

The user administration server 43 that receives the registration information produces an "ID number" from the new sequence position I (for example, I=2 if two users, 0 and 1, have already been registered) of the sequence registering the user information and the number N of user administration servers (assume for example that N=3), and one's own user administration server number M (assume for example that M=1). The production formula is ID=I×N+M, and in the above-mentioned example this will be ID=2×3+1=7. The user administration server 43 registers the personal information at new sequence position I of the sequence registering the user information, and notifies the registration server 61 of the ID number produced (S6).

The registration server 61 sends to the terminal the participation page that embeds the ID number received (S7). The address and ID number of the aggregation node that is selected are listed on this participation page, and when the user carries out the participation operation with the participation page, the participation information containing the ID is sent to the aggregation node that is selected (S8).

At the aggregation node, the load balancers forward the calls (accesses) to an optional user proxy server in the order in which they arrive (S9), and when the user proxy server 42 receives the participation information, it sends the operation information that embeds the ID number (S10), and this is displayed in the form of an operation page at the terminal (S11). The participation preparation is concluded thereby. That is to say, in accordance with the embodiments of the invention, the operation page can, by way of example, be used in conjunction with a television quiz program or the like, wherein the viewing audience participates by responding using a terminal (30) such as a personal computer or cell phone which is capable of running a browser such as those that are commonly used to connect a terminal (30) with the internet, and which is cable of processing HTML type Web page data.

Figure 5:
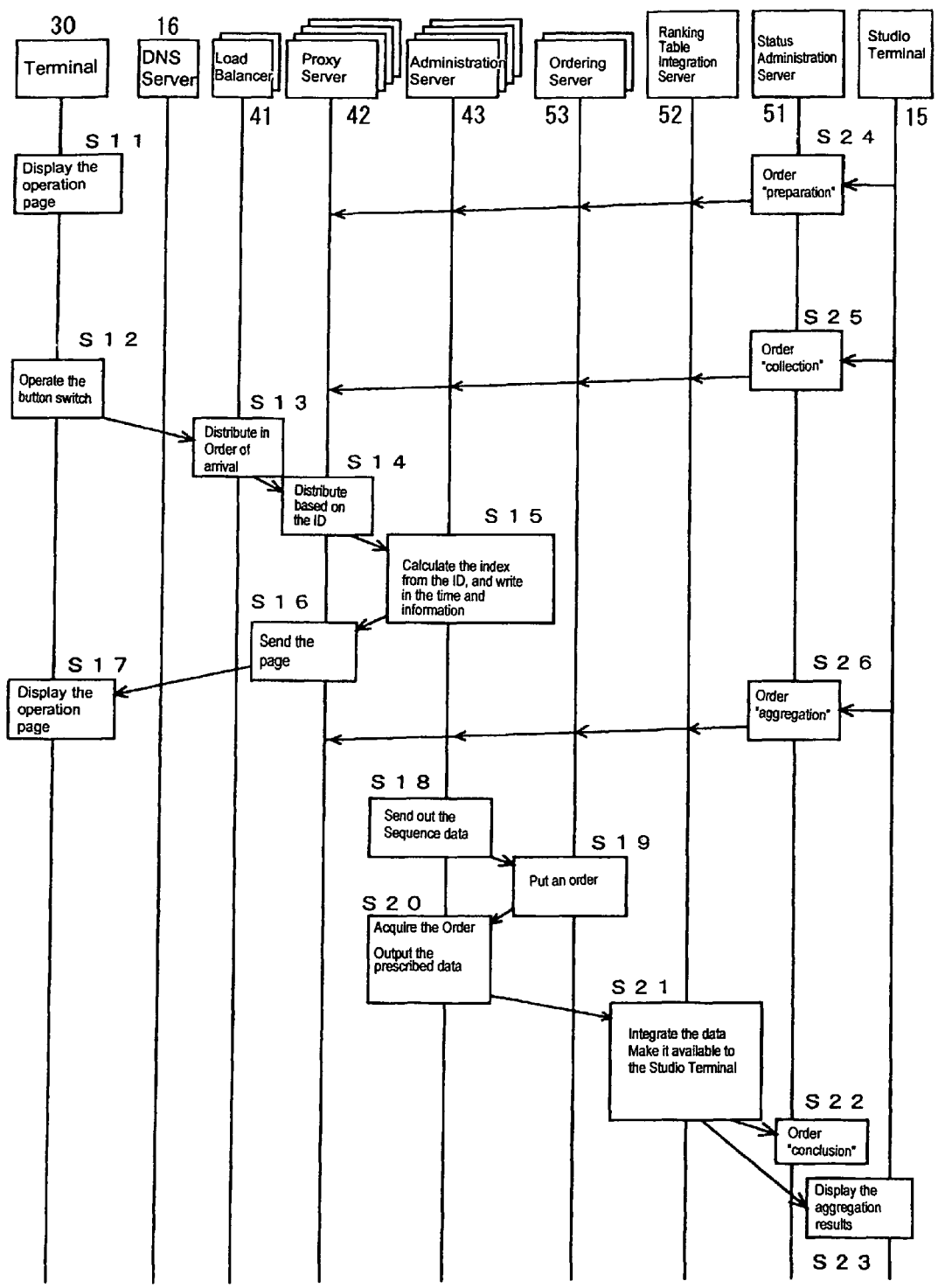
FIG. 5 is Flow Chart 2, which shows the exchange of processing between each apparatus of the present invention.

FIG. 5 is Flow Chart 2, which shows the exchange of processing between each apparatus of the present invention. This flow chart shows one aggregate processing of the responses to quizzes and surveys related to the program, and in reality this processing is repeated several times with the program. First, the status administration server 51 directs a "preparation" state, based on the instruction from the studio terminal 15 (S24). In the "preparation" state, only the same operation page is returned at the user proxy server even if the terminal is operated and the operation information is sent, so no processing whatsoever is done.

Next, the status administration server 51 directs a "collection" state, based on the instruction to begin receiving responses from the studio terminal 15 (S25). In the "collection" state, when the users operate the terminal and send the operation information, it is connected to the designated aggregation node, and the load balancers transfer the calls to the optional user proxy server in the order in which they arrive (S13).

At the user proxy server 42, the data formats that differ for each terminal of the users are unified, the user administration server number is calculated based on the remainder obtained by dividing the ID numbers contained in the operation information received by the number of user administration servers, and the operation information is forwarded to said user administration server (S14). At the user administration server 43, the sequence position is calculated based on the quotient obtained by dividing the ID numbers of the operation information received by the number of user administration servers in the node, and the user information is recorded (S15).

Assuming for example that the quotient=2, the operation information such as the information about the button pressed by the user is recorded along with the time information (the elapsed time from the start of collection in units of milliseconds) is recorded for the user data for number 2 of the sequence, The processing can be done at high speed by placing this sequence data on the memory beforehand.

When the registration of information is finished, the user administration server 43 notifies the user proxy server that it is finished, and the user proxy server 42 sends the operation page to the terminal (S16). The operation page is displayed again at the terminal (S17). In those cases where a user carries out the operation multiple times during information collection, the operation information, etc. may be overwritten, or it may be configured so that the operation information from the second time on is ignored.

Next, the status administration server 51 directs an "aggregation" state, based on the aggregation (receipt finished) instruction from the studio terminal 15 (S26). In the "aggregation" state, only the same operation page is sent to the user proxy server even if operation information is sent from the terminal, and no processing whatsoever is done. The user administration server 43 establishes the score from, for example, the operation information and time information from the user, and produces passing sequence data like that shown in FIG. 7 from the user information sequence and sends this to the prescribed ordering server 53 (S18).

At the ordering server 53, the sequence data is collected from a plurality of user administration servers, the score is converted into a rank by the method described below, and the ranking information is delivered again to the user administration server 43 (S19). A plurality of ordering servers 53 is described in FIG. 3, but this is for carrying out several ordering processings such as the overall score and the scores in each question by separating them, and it is necessary to carry out one ordering processing by one ordering server. At the user administration server 43, a ranking is imparted to the user based on the ranking information that is delivered, and in addition information within a range that is determined beforehand, such as, for example, the personal information of the ten top ranking persons, is sent to the ranking integration server 52 (S20).

At the ranking integration server 52, the ranking table is integrated (synthesized) based on the information received from the plurality of user administration servers 43, and it is sent and made public to the studio terminal and the external web server function, etc. In addition, the status administration server is notified of the conclusion of the ordering (S21).

By means of the above-described constitution and processing, high-speed aggregation and ordering becomes possible, without any delays or malfunctioning even if the calls are concentrated in a short period. FIG. 5 discloses an example where aggregation is not carried out during "collection", but it is also possible to carry out interim aggregation, by all the user administration servers executing the processing of S18 periodically such as, for example, once every second or non-periodically. The information about the top-ranked users and the number of respondents up to the present can be learned more or less in real time by intermediate aggregation.

Figure 6:
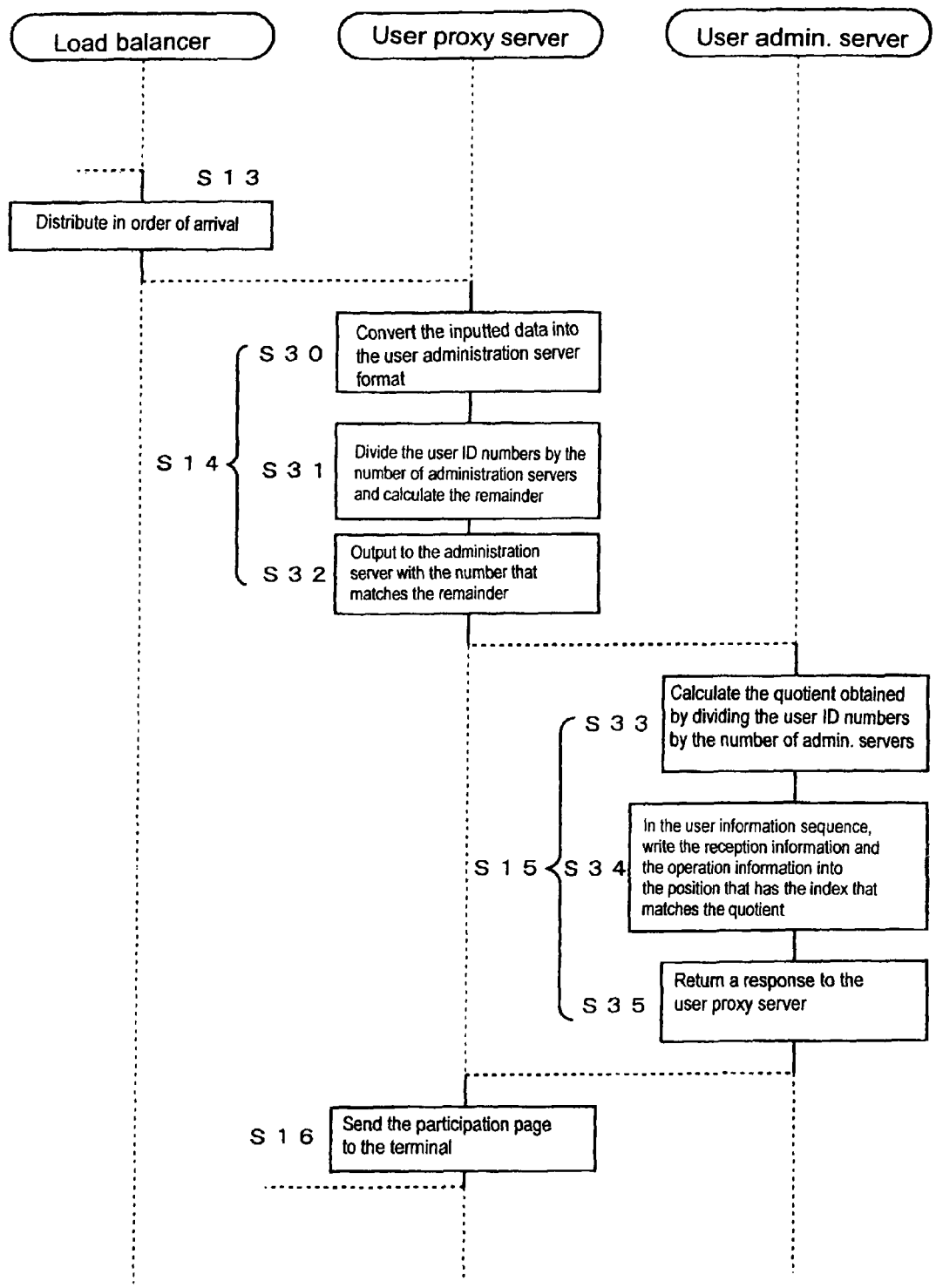
FIG. 6 is a flow chart that shows the details of the registration processing of the operation information of the present invention.

Next, a more detailed description is provided of the aggregation/ordering of the operation information. FIG. 6 is a flow chart that shows the details of the collection processing of operation information. In addition, FIGS. 9 to 12 are explanatory diagrams that show the collection processing of the operation information. In the example in FIGS. 9 to 12, three user administration servers (=user managers), server index 0, 1 and 2, have been deployed, and it is assumed that three users of the sequence index 0, 1 and 2 in the user information sequence have been registered for example in index 1.

Figure 10:
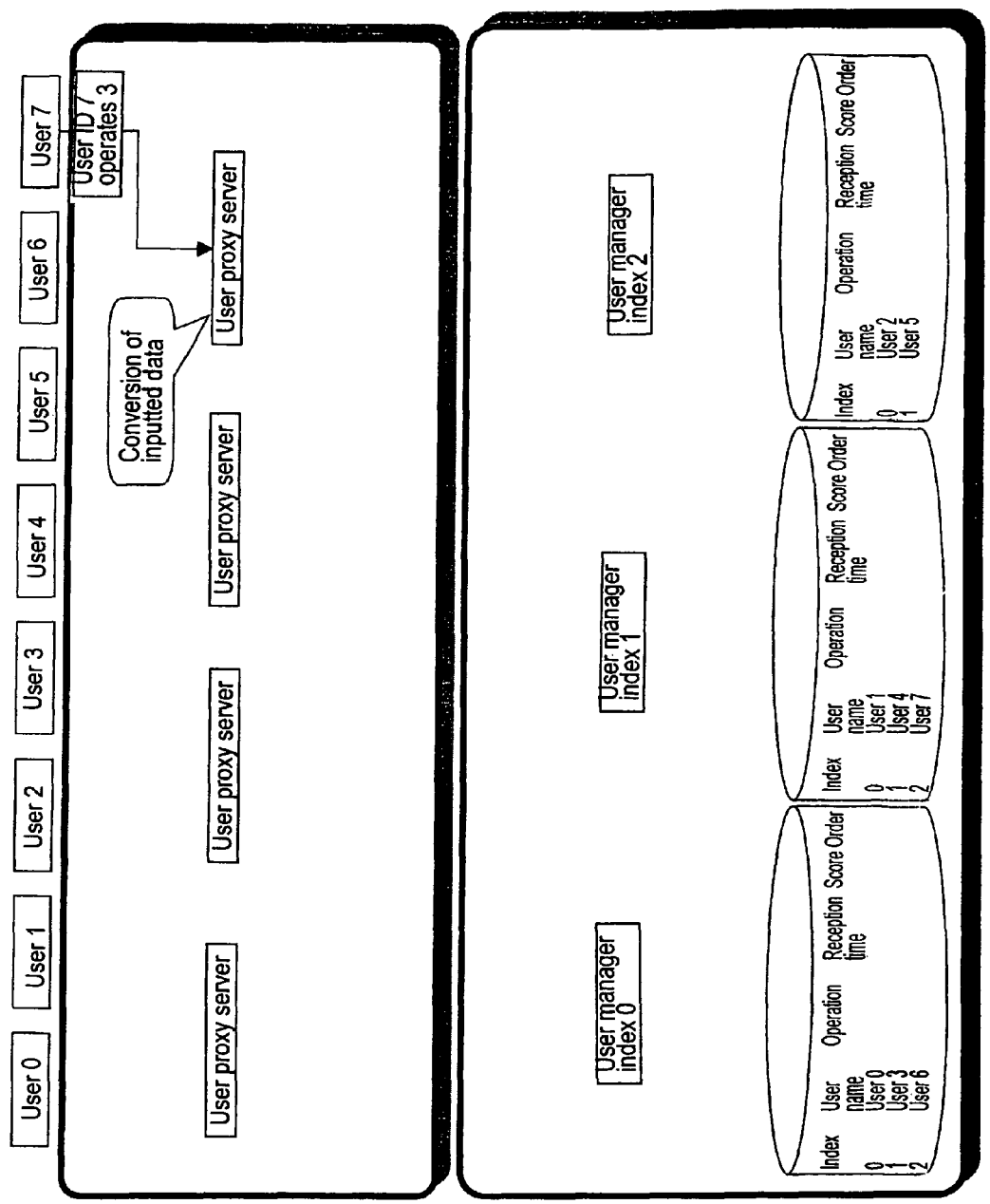
FIG. 10 is Explanatory Diagram 2, which shows an example of the registration processing of the operation information.

At S13 in FIG. 6, the load balancers forward the calls to the optional user proxy server in their order of arrival. The user proxy server converts/unifies the data inputted in S30 into the user administration server format. This is necessary since the data format differs for each terminal (FIG. 10).

Figure 11:
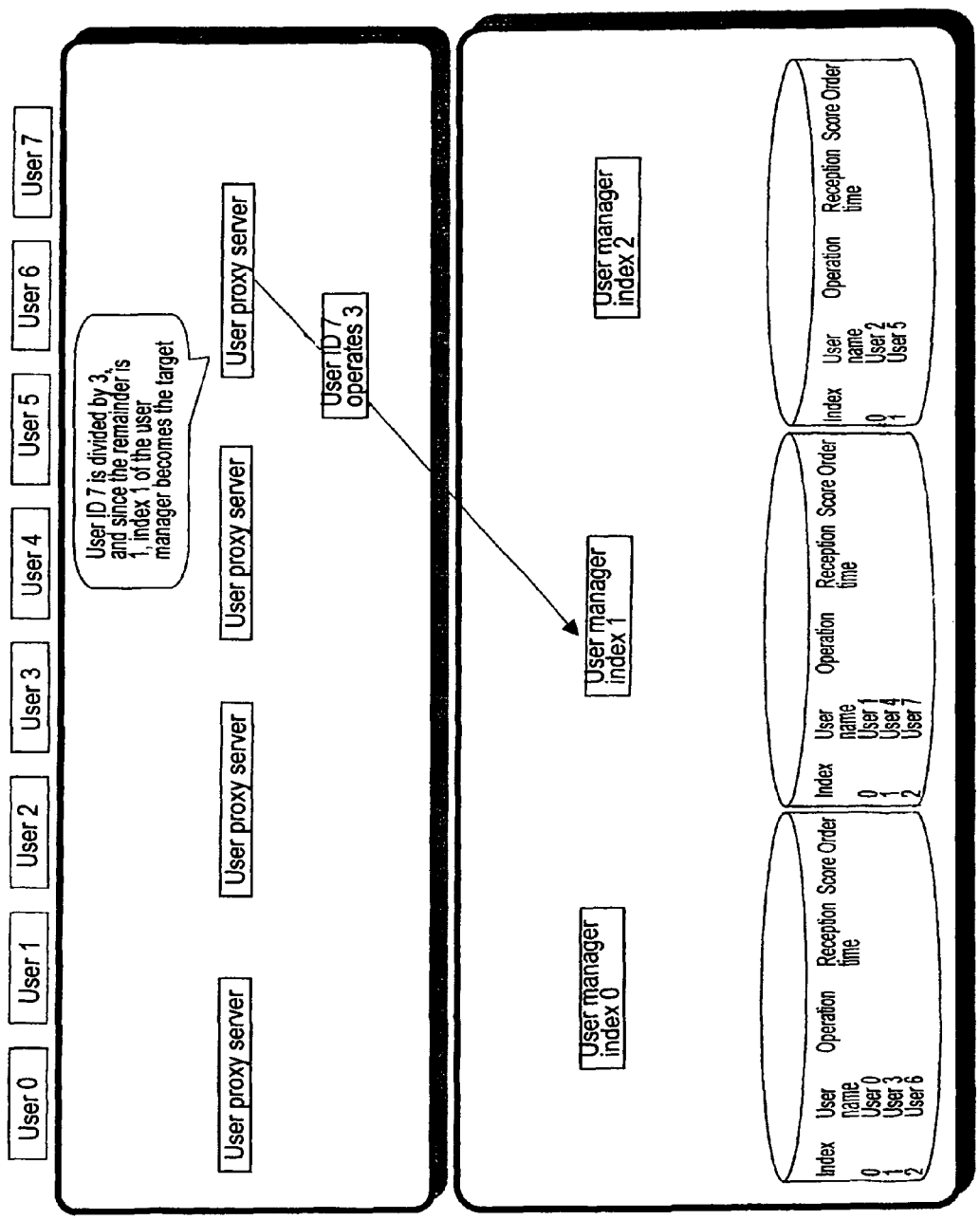
FIG. 11 is Explanatory Diagram 3, which shows an example of the registration processing of the operation information.

The user proxy server 42 calculates the user administration server number based on the remainder obtained by dividing the ID numbers contained in the operation information received at S31 by the number of user administration servers, and forwards the operation information to said user administration server. Assuming for example that the ID number is 7, and that the number of user administration servers is N=3, the user administration server number M will be the remainder of 7÷3=1. At S32, the operation information of the user is outputted to the user administration server of the index that matches the remainder (FIG. 11).

Figure 12:
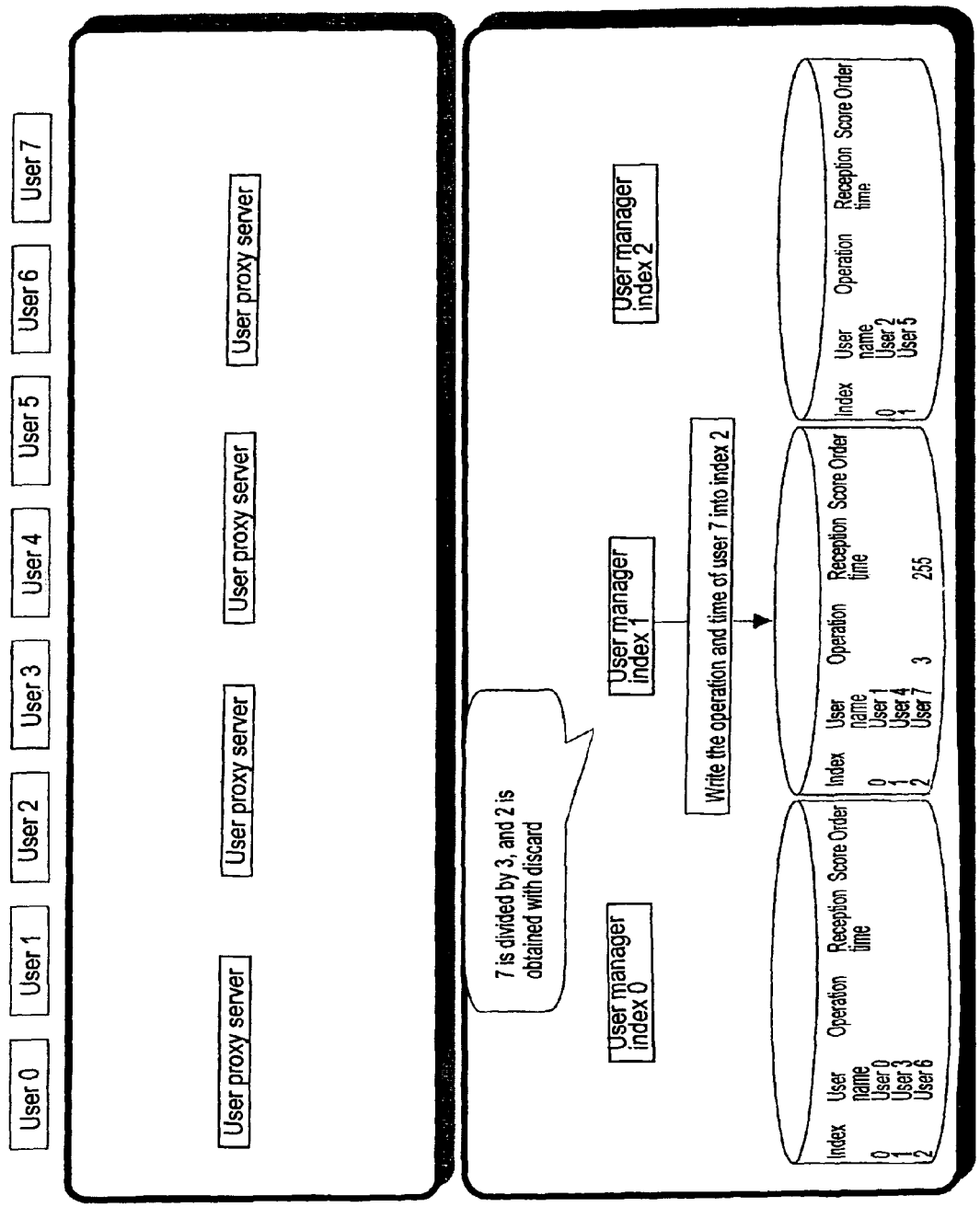
FIG. 12 is Explanatory Diagram 4, which shows an example of the registration processing of the operation information.

The user administration server 43 calculates the sequence position (sequence index) based on the quotient obtained by dividing the ID number of the operation information received in S33 by the number of user administration servers. Assuming for example that the quotient is 2, the operation information such as the information about the button pressed by the user is registered along with the time information (the elapsed time from the start of collection in units of milliseconds) in the user data of sequence index number 2 (FIG. 12). At S35, when the recording of the information is finished the user administration server 43 notifies the user proxy server that it is finished.

In the above processing, the load balancers solely distribute calls only to an optional proxy server, so high-speed processing becomes possible, and moreover expansion is also easy. In the case of the user proxy server, the user administration server to which the forwarding is done is identified by a simple calculation from the ID number received, so high-speed processing becomes possible, and expansion is also easy. As for the user administration servers, the user information sequence position at which the data should be stored is identified by a simple calculation, so high-speed processing becomes possible, and expansion is also easy.

The present inventors can actually use this system in concert with a television program to receive and respond normally to tens of thousands of calls in about 10 seconds, with the rate at peak time being several tens of thousands of calls per second, and to carry out ordering of the calls.

Figure 8:
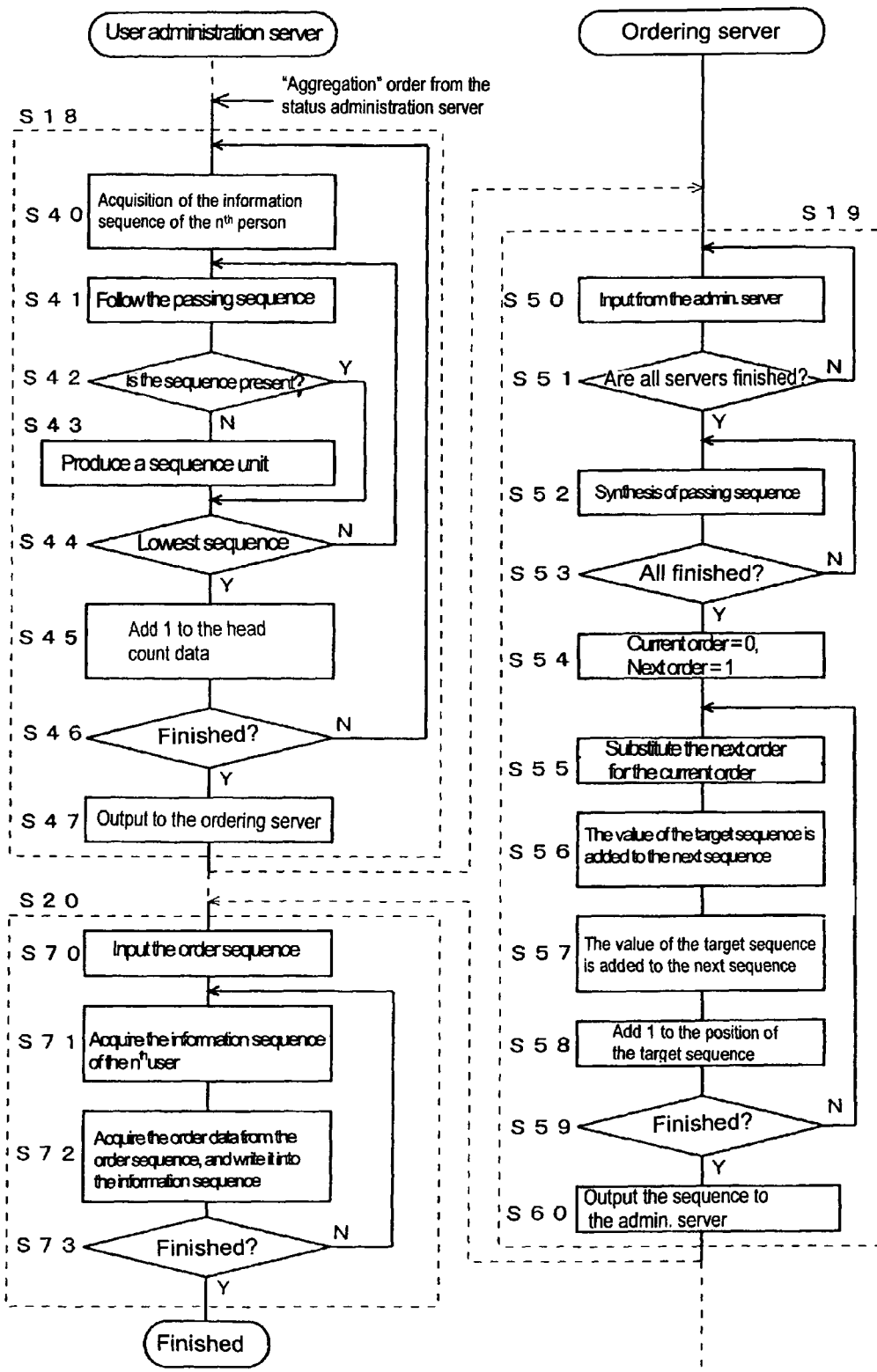
FIG. 8 is a flow chart that shows the details of the aggregation/ordering processing of the present invention.
Figure 9:
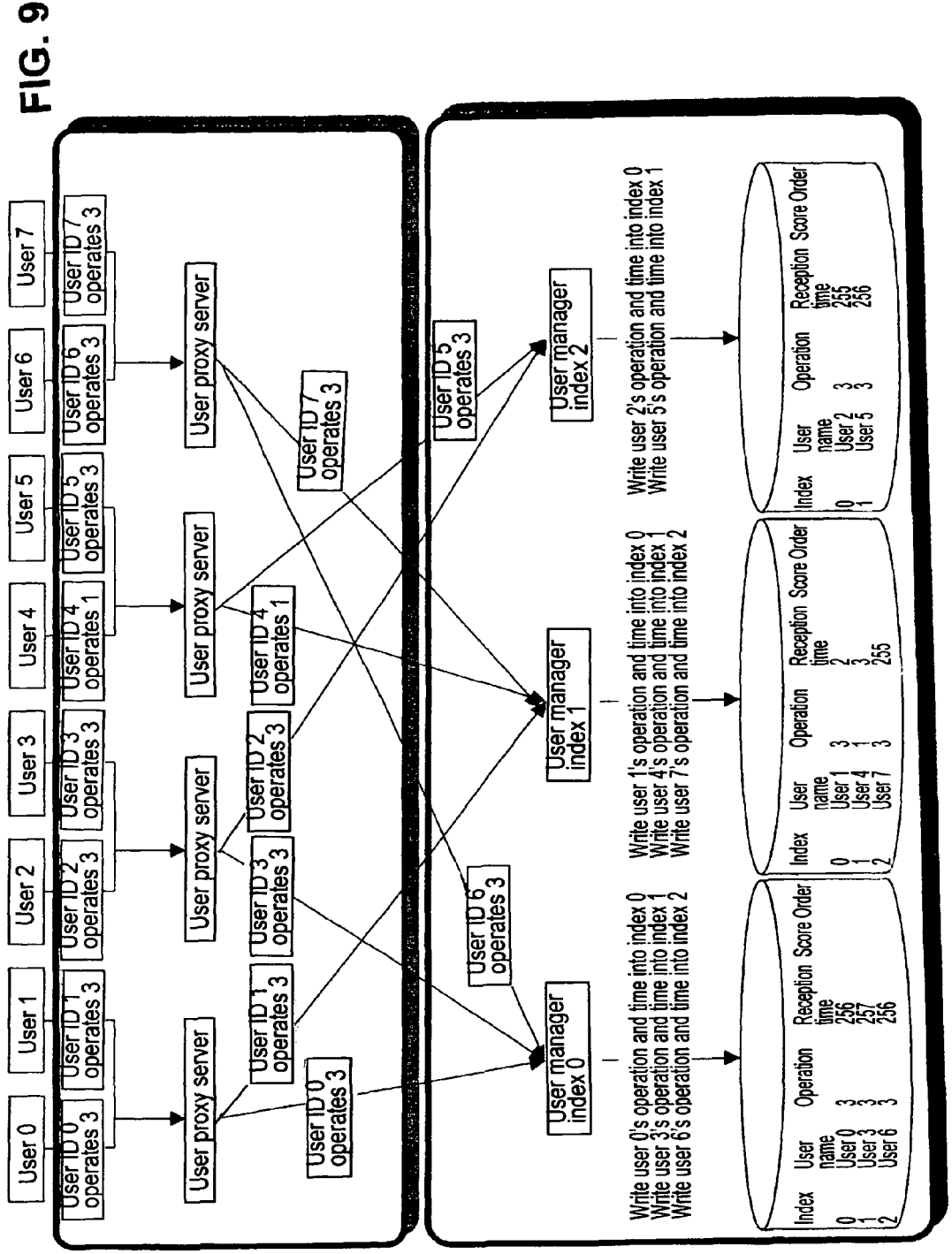
FIG. 9 is Explanatory Diagram 1, which shows an example of the registration processing of the operation information.

FIG. 8 is a flow chart that shows the details of the aggregation/ordering processing of the present invention. In addition, FIGS. 13 to 31 are explanatory diagrams that show an example of the aggregation/ordering processing. In the example in FIGS. 13 to 31, it is assumed that three user administration servers (=user managers) of server index 0, 1 and 2 have been deployed.

Figure 13:
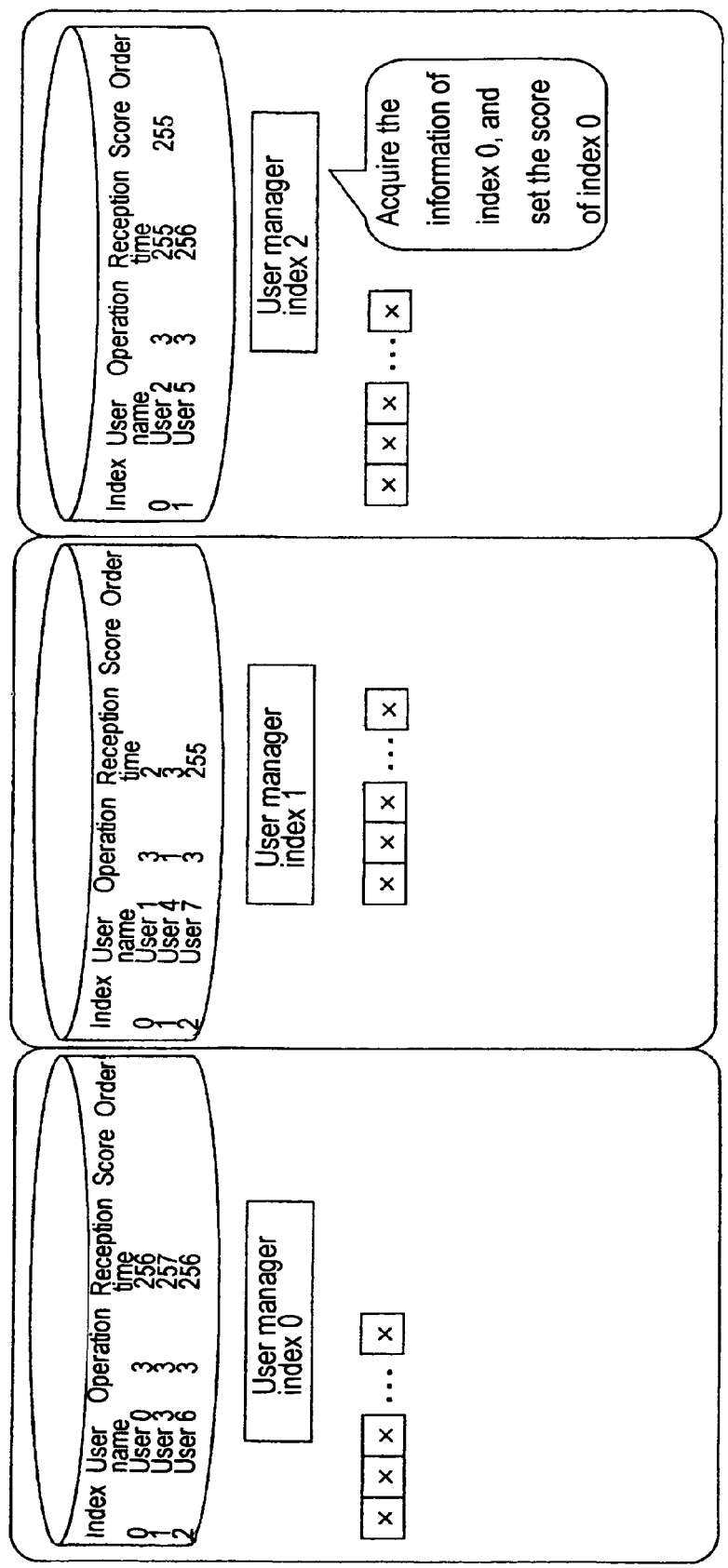
FIG. 13 is Explanatory Diagram 1, which shows a processing example for S40 in FIG. 8.
Figure 15:
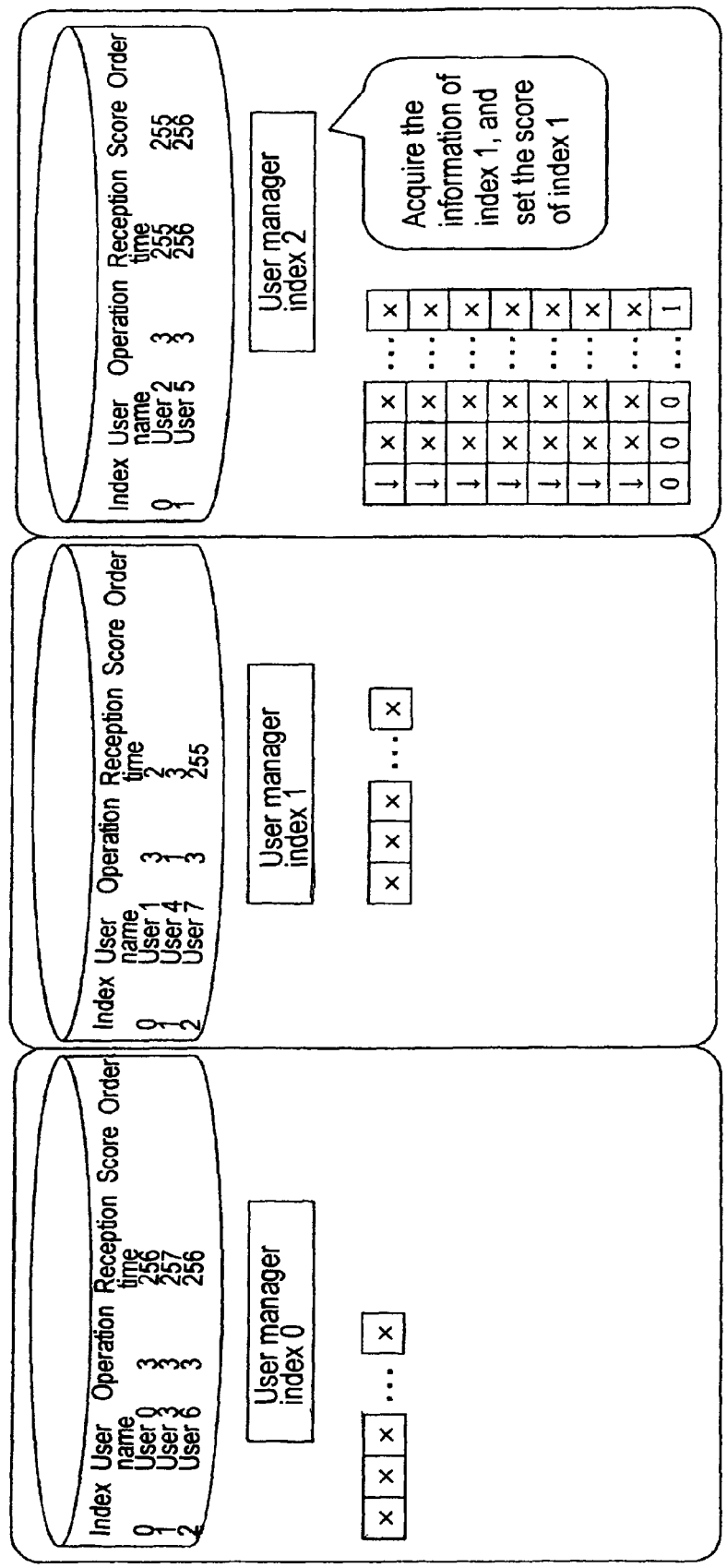
FIG. 15 is Explanatory Diagram 2, which shows a processing example for S40 in FIG. 8.

At S40 in the user administration server, the information sequence of the nth user is acquired. Then, the score is established for each user. In this example, the user information "3" is taken to be the correct answer, and the reception time information, which is the elapsed time from the start of collection in units of milliseconds, is taken to be the score (based on point deduction) for the correct respondents. In addition to the operation time information of the correct respondents for each question, it is also possible to calculate in accordance with need the number of correct answers, the total time of the operation time for the correct answers to multiple questions, the combination of these, etc., as the score information that is the basis for assigning the order. FIG. 13 and FIG. 15 are explanatory diagrams that show a processing example for S40.

Figure 7:
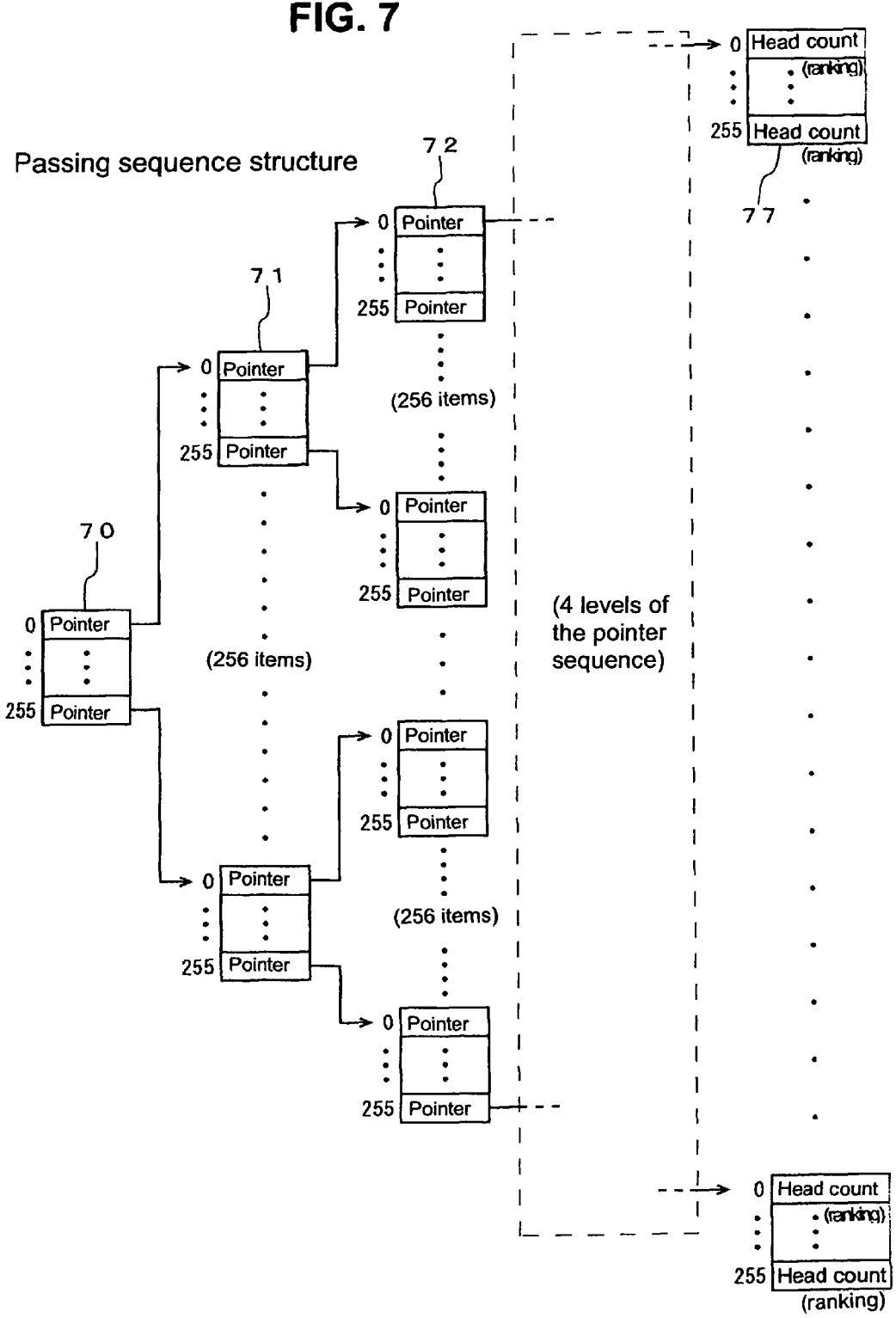
FIG. 7 is an explanatory diagram that shows the data composition of the passing sequence of the present invention.

At S41, the passing sequence is traversed based on the score information. FIG. 7 is an explanatory diagram that shows the data composition of the passing sequence of the present invention. The score (reception time) information is the information about the elapsed time from the start of collection in units of milliseconds, but this is deemed to be 64-bit score information, and the numerical data that shows the number of persons or the ranking is memorized for each score specified by this 64-bit. However, a sequence unit of 256 (8-bit) points or numerical data is taken to be the unit of the data of the passing sequence, and only the lowest numerical unit that includes data other than when the number of users is 0 and point units that include points that specify directly or indirectly the unit thereof are produced.

The passing sequence has eight levels as shown in FIG. 7, and the upper seven levels are composed of 8-bit (=256) point units 70, 70, 72 . . . within the above-mentioned 64-bit score information. The lowest level is 77, which is composed of 256 (8-bit) numerical values. Therefore, the headcount data of the users that, for example, respond correctly from 0 milliseconds to 25 milliseconds after the start of collection is stored in the numerical unit 77 at the upper right of FIG. 7. Then, the point units 70, 71, 72 . . . of the upper seven levels that indicate this unit in those cases where there are numerical values other than 0 are also produced in this numerical unit.

When the time is expressed in 64-bit with milliseconds as the unit, it has an astronomical length, and when all the numerical units 77 of the passing sequence are produced the amount of data is also an astronomical amount. But in those cases where the score data is concentrated in limited time band, it ends with only a small amount of data for the passing sequence, and is an amount that can be adequately handled in a personal computer, etc.

Returning to FIG. 8, at S42, a determination is made about whether or not a sequence that corresponds to the 64-bit score information from the upper level is present, and when the determination result is negative it moves to S43 and a new sequence unit is produced, and the points to this sequence unit are set up in the upper rank unit. At S44, a determination is made about whether this is the lowest level sequence (=numerical unit), and when the determination result is negative it moves to S41, but when it is positive it moves to S45.

At S45, 1 is added to the head-count data for the position that corresponds to the score information in the numerical unit. At S46, a determination is made about whether or not all the processing of the data for users that responded correctly is finished, and when the determination result is negative it returns to S40, but when it is positive it moves to S47. At S47, the passing sequence data produced is outputted to the ordering server.

Figure 14:
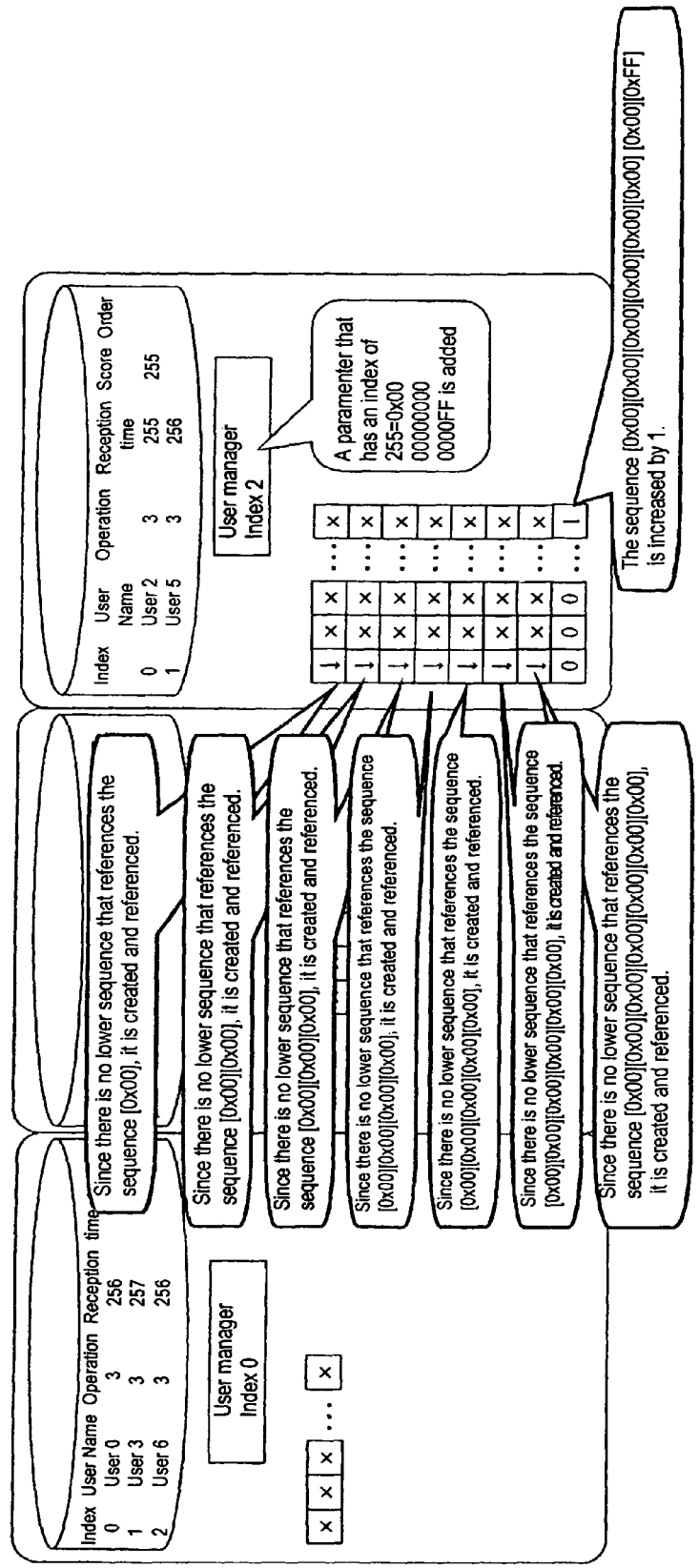
FIG. 14 is Explanatory Diagram 1, which shows a processing example for S41 to S45 in FIG. 8.
Figure 16:
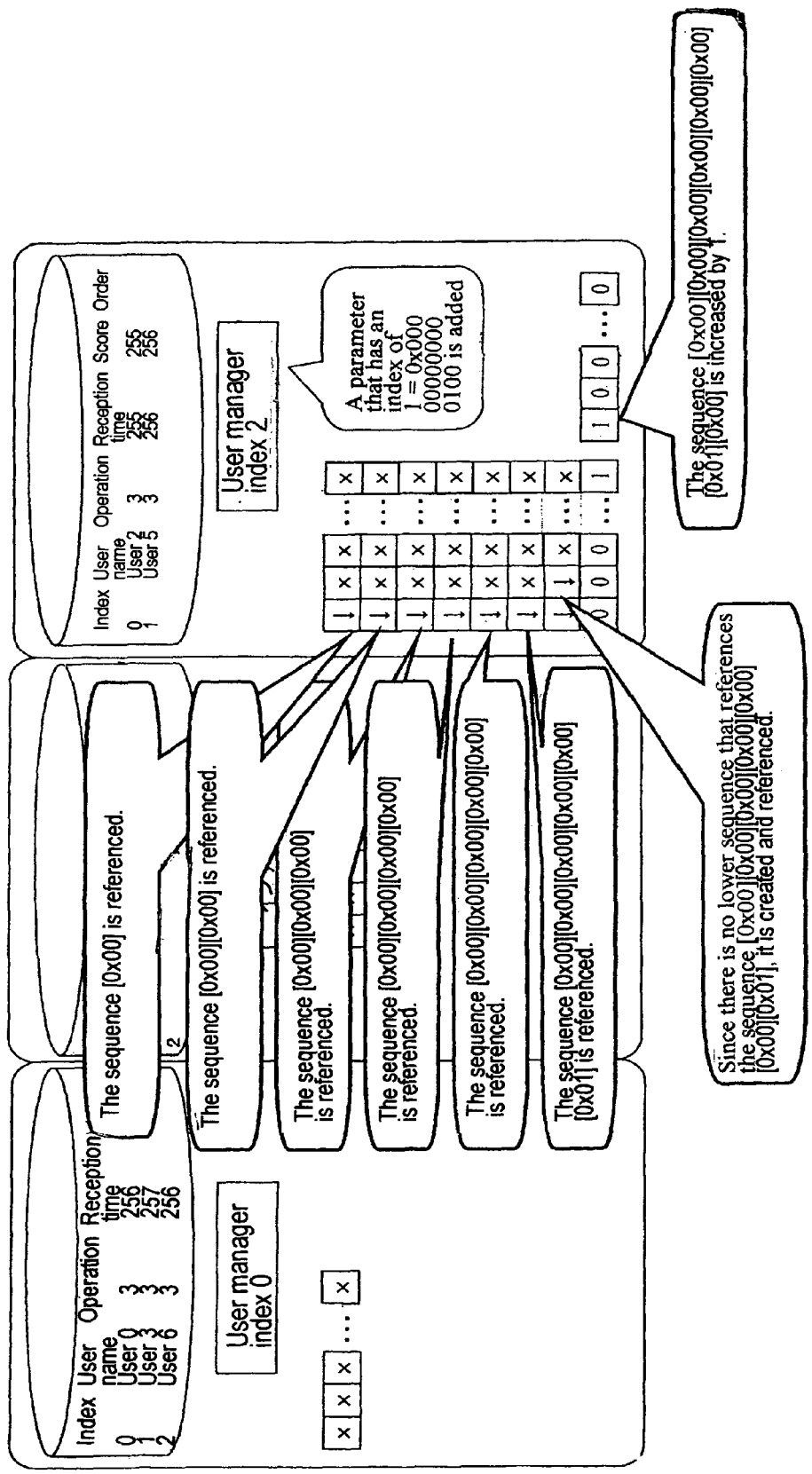
FIG. 16 is Explanatory Diagram 2, which shows a processing example for S41 to S45 in FIG. 8.

FIG. 14 and FIG. 16 are explanatory diagrams that show a processing example for S41 to S45. The arrow pointing downwards in the passing sequence in the diagram stands for the pointer, and the X symbol stands for a state in which the pointer has not been set. In FIG. 14, everything up to the lowest level sequence unit (=numerical unit) is produced/referenced, and 1 is added to the head-count data (initial value 0) of the 255 address (corresponding to the lower level 8-bit of the score=255) of the lowest level sequence unit. "To reference" means to set the pointer that indicates the lower level unit in the upper level pointer unit. In FIG. 16, the lowest level sequence unit in the following ranking is produced, and 1 is added to the head-count data of the 0 address thereof.

At S50 in the ordering server, the passing sequence data is inputted from the user administration servers. At S51, a determination is made about whether or not the inputting from all servers is finished, and when the determination result is negative it moves to S50, but when it is positive it moves to S52. At S52, synthesis of a plurality of passing sequences is carried out by totaling the head-count data with the same score. At S53, a determination is made about whether or not the synthesis of all the passing sequences is finished, and when the determination result is negative it moves to S52, but when it is positive it moves to S54. Sequences in which the head-count data is stored are produced by the following processing.

At S54, initialization of the variables, etc., is carried out. That is, it is set so that the current order=0, and the next order=1, and the targeted sequence position is set at 0 (=the beginning). At S55, the value of the next order is substituted into the current order. At S56, the value of the target sequence is added to the next order. At S57, the value of the current order is substituted into the target sequence. At S58, 1 is added to the position of the target sequence. At S59, a determination is made about whether or not all the processing of the existing head-count data is finished, and when the determination result is negative it moves to S55, but when it is positive it moves to S60. At S60, the order sequence produced is outputted to each user administration server.

Figure 17:
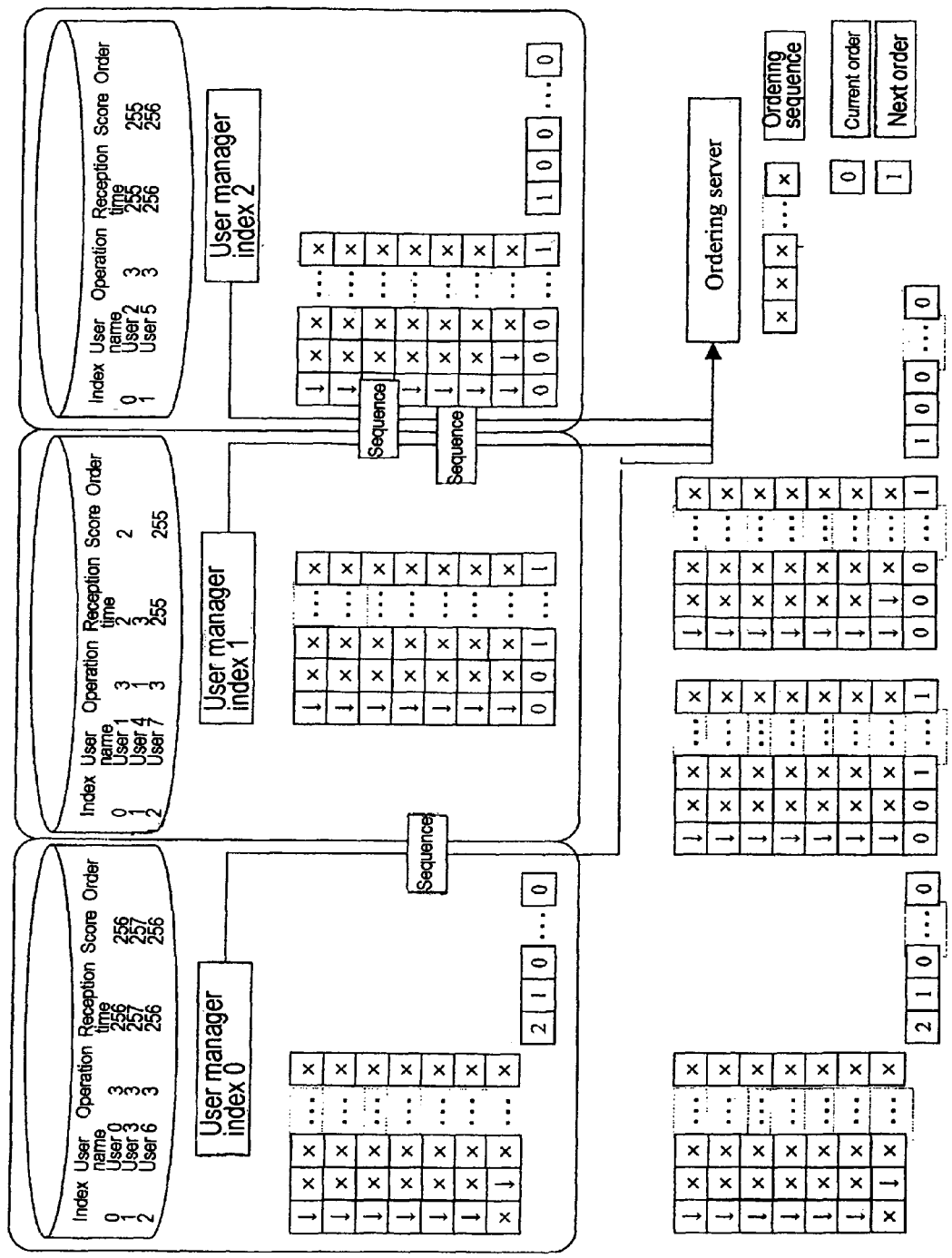
FIG. 17 is an explanatory diagram that shows a processing example for S50 and S50 in FIG. 8.
Figure 18:
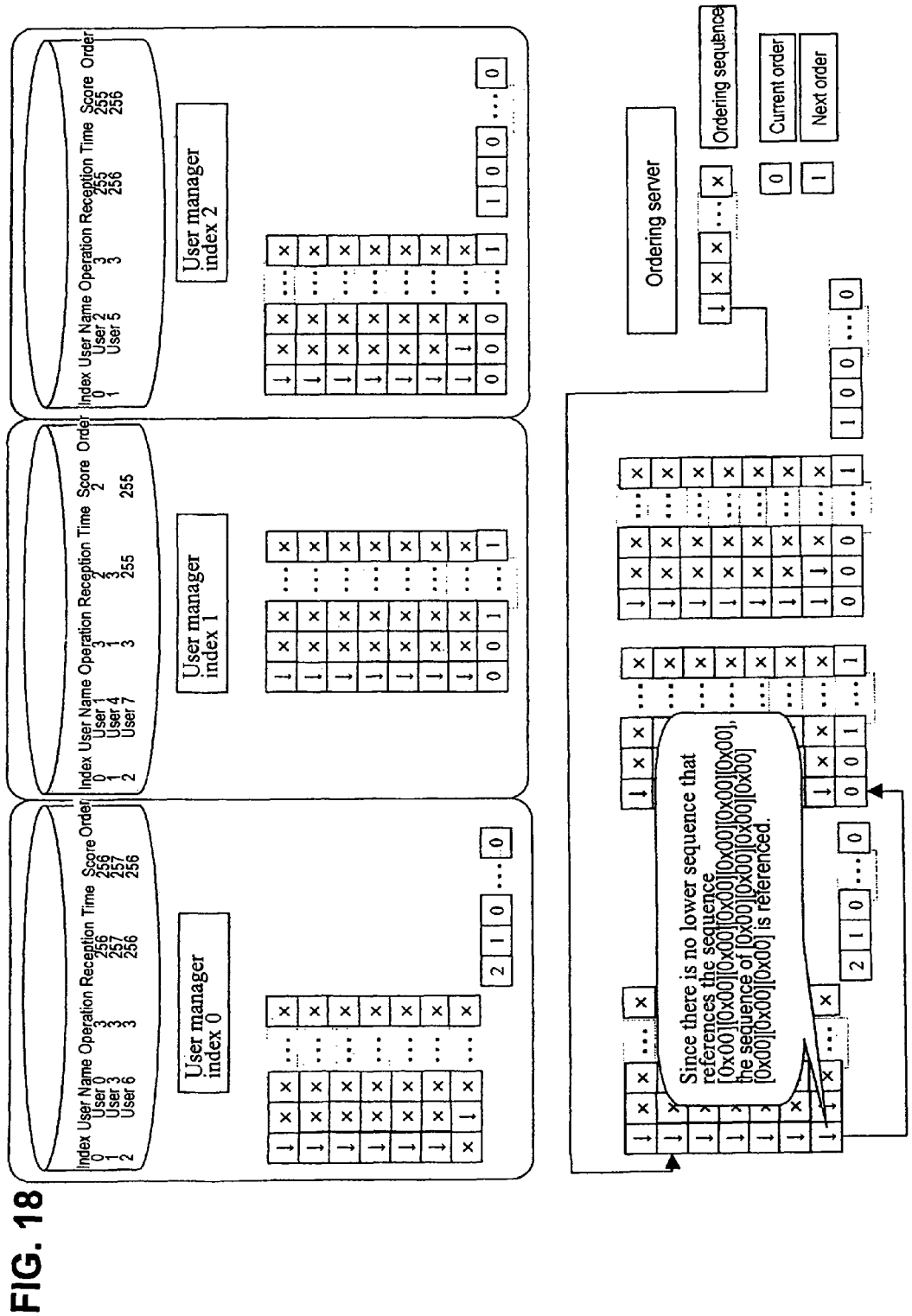
FIG. 18 is Explanatory Diagram 1, which shows a processing example for S52 and S53 in FIG. 8.
Figure 19:
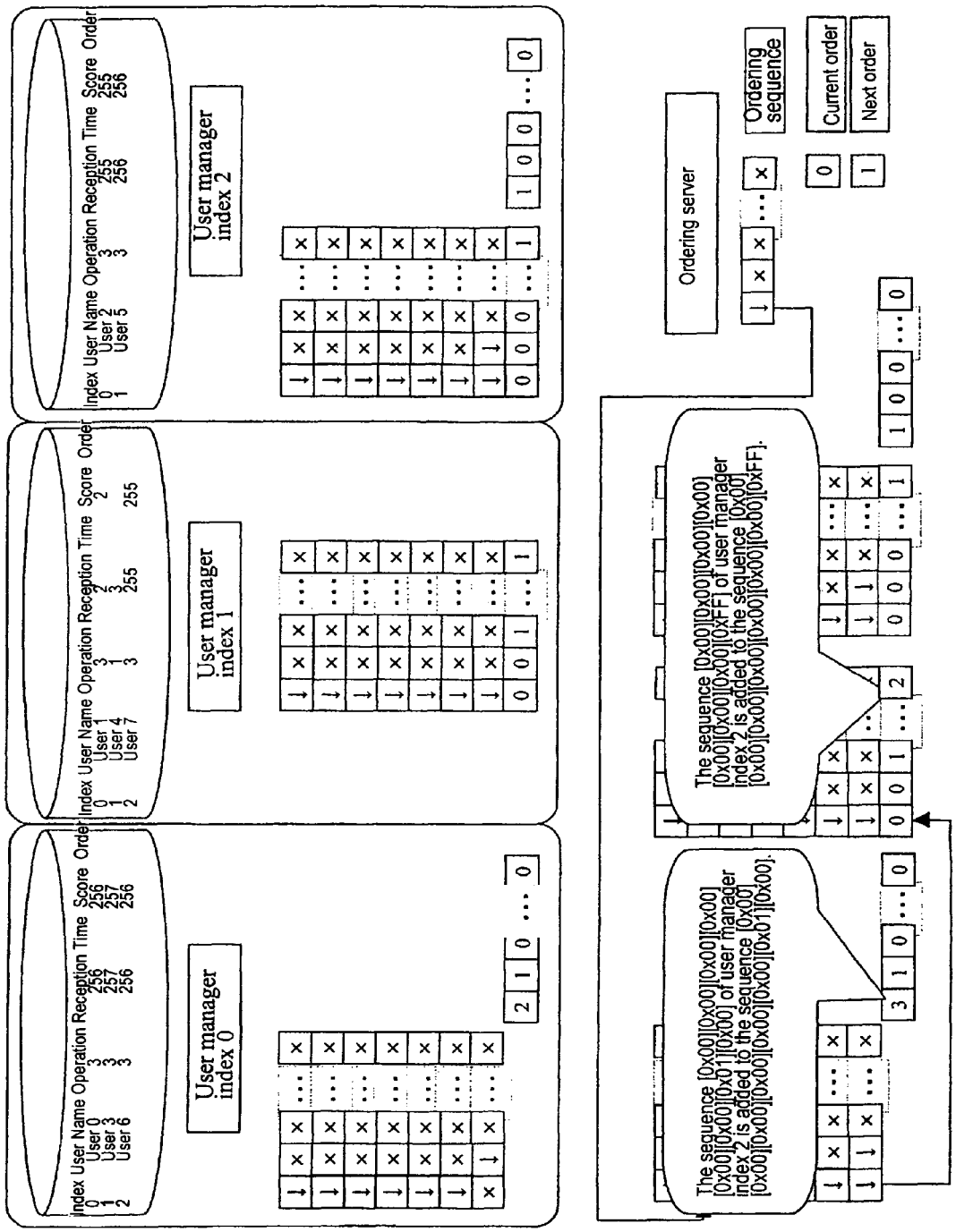
FIG. 19 is Explanatory Diagram 2, which shows a processing example for S52 and S53 in FIG. 8.
Figure 20:
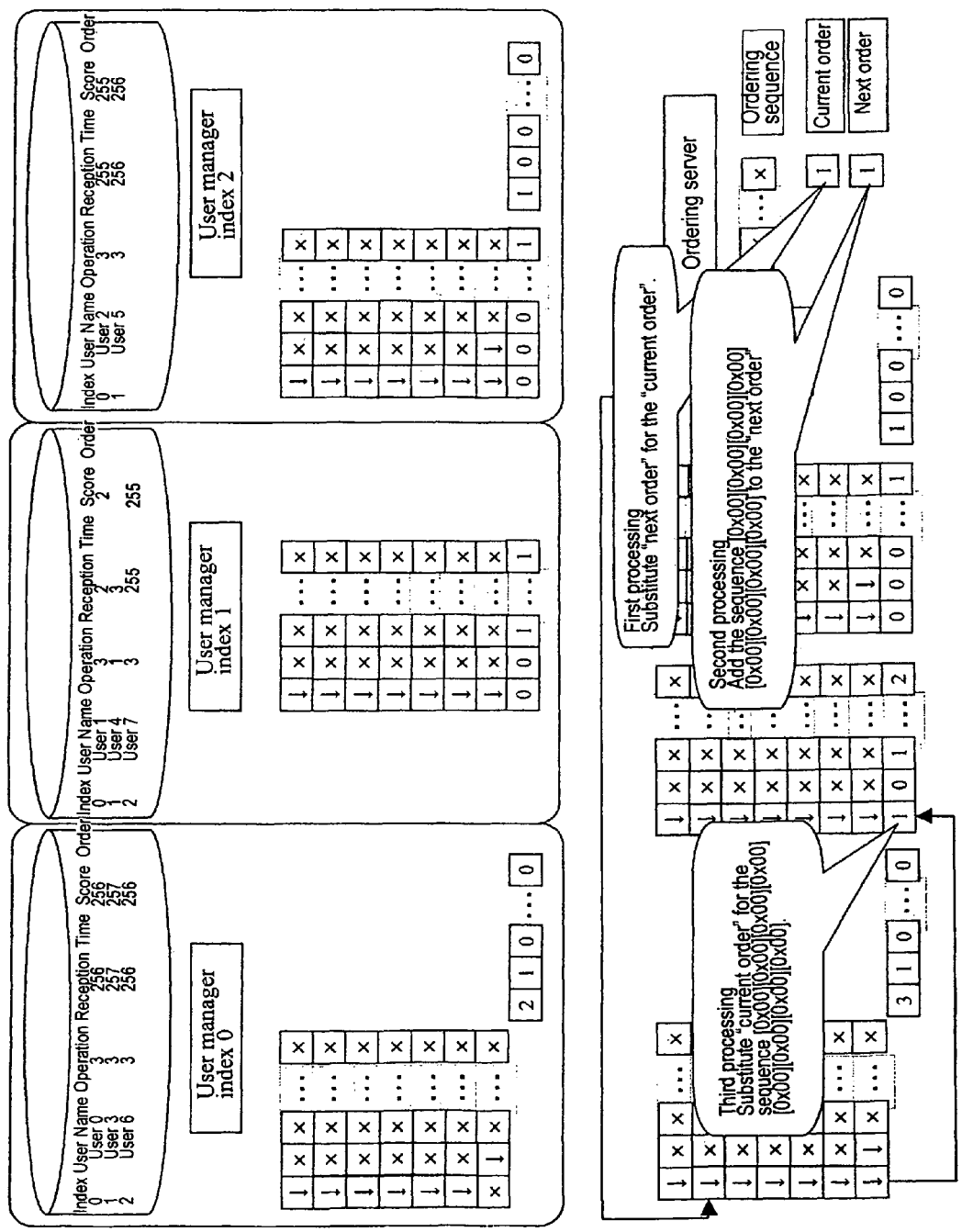
FIG. 20 is Explanatory Diagram 1, which shows a processing example for S55 to S59 in FIG. 8.
Figure 21:
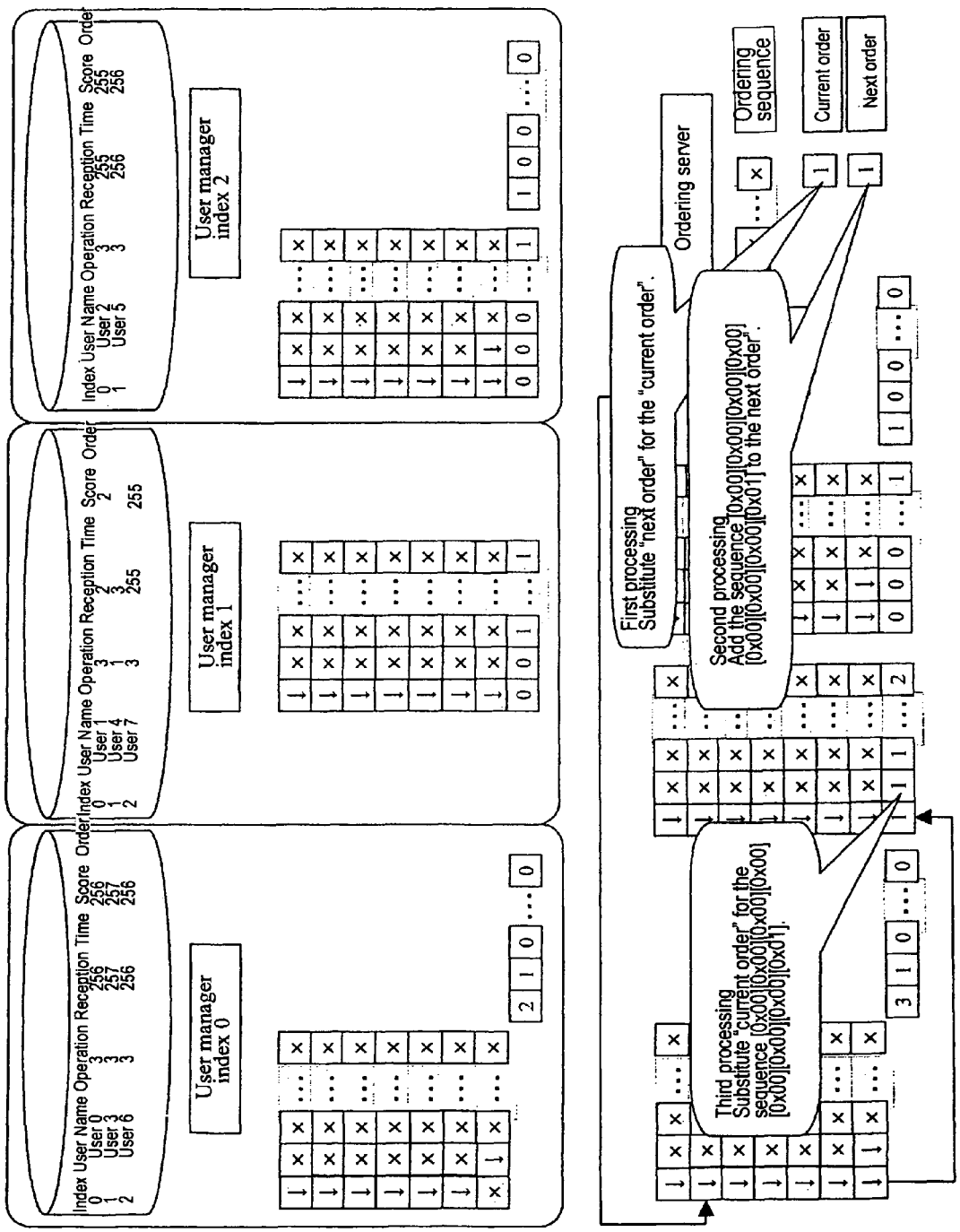
FIG. 21 is Explanatory Diagram 2, which shows a processing example for S55 to S59 in FIG. 8.
Figure 22:
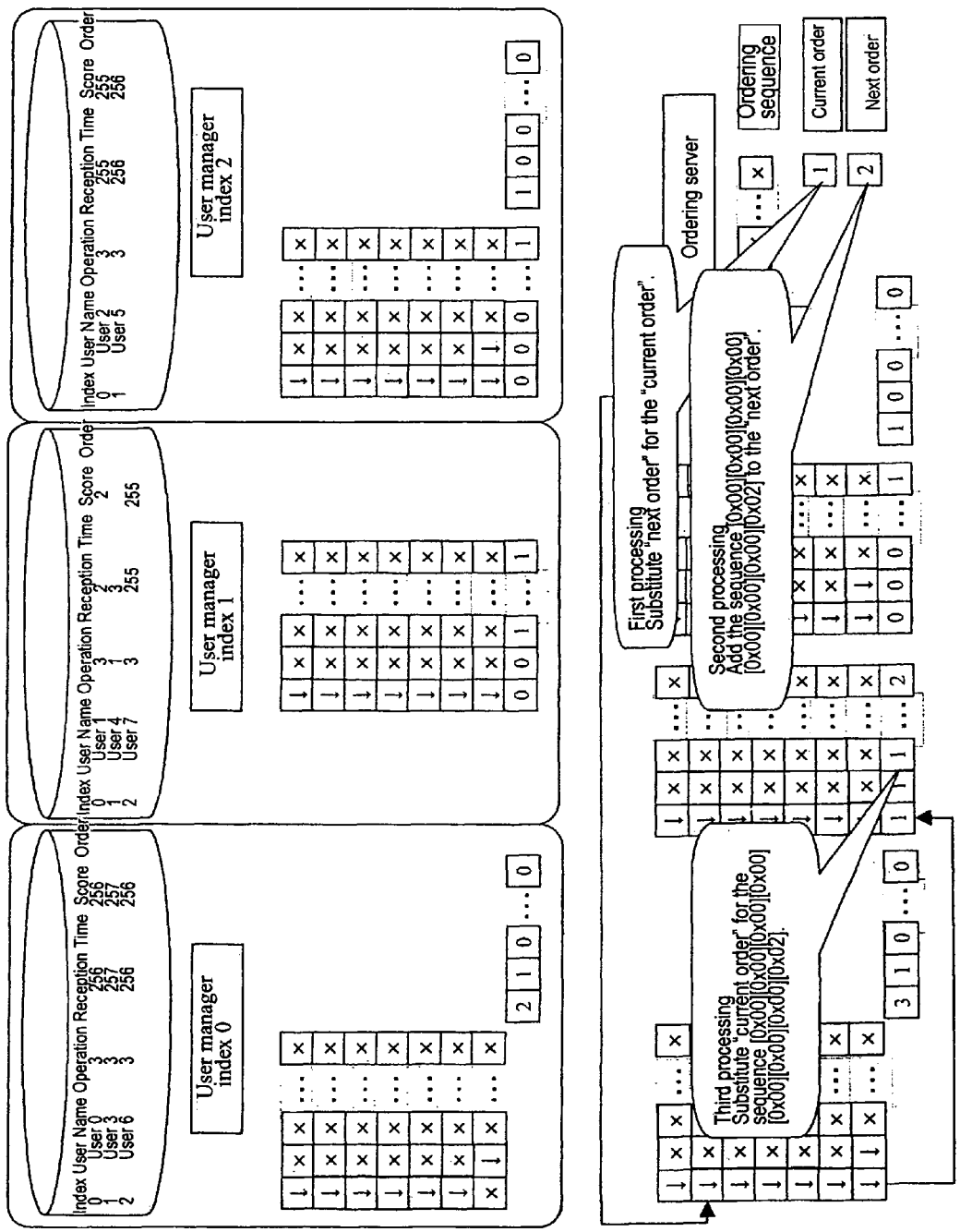
FIG. 22 is Explanatory Diagram 3, which shows a processing example for S55 to S59 in FIG. 8.
Figure 23:
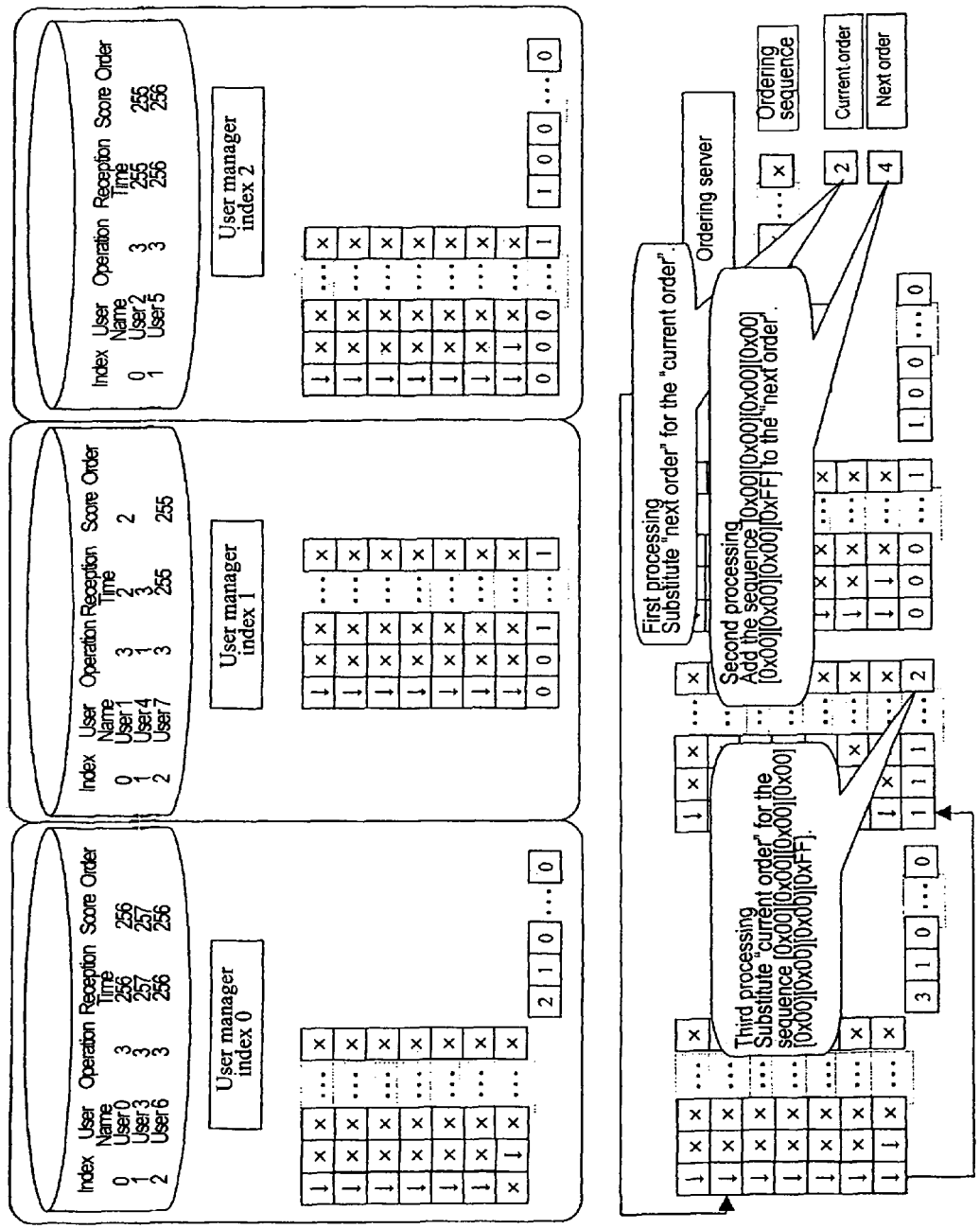
FIG. 23 is Explanatory Diagram 4, which shows a processing example for S55 to S59 in FIG. 8.
Figure 24:
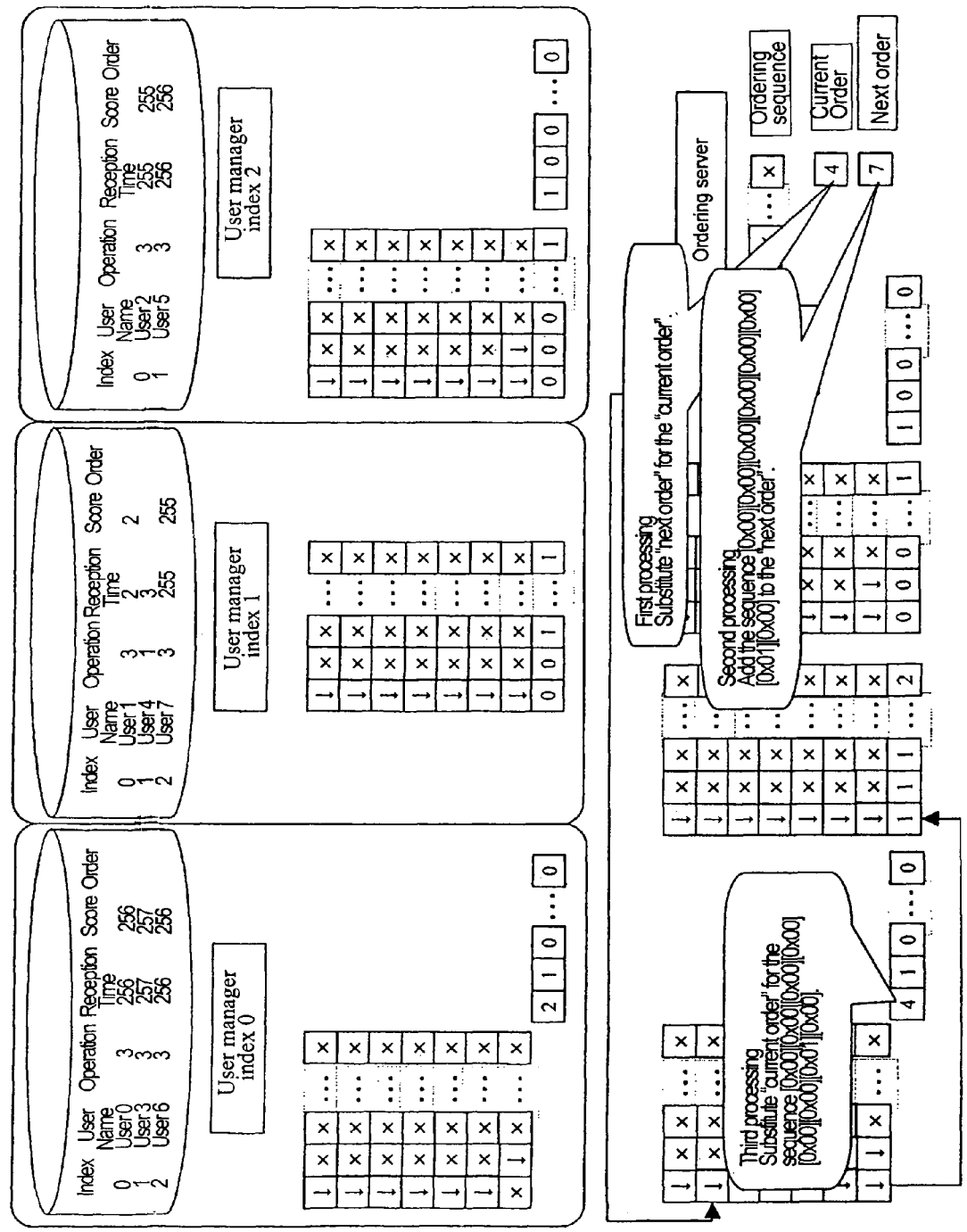
FIG. 24 is Explanatory Diagram 5, which shows a processing example for S55 to S59 in FIG. 8.
Figure 25:
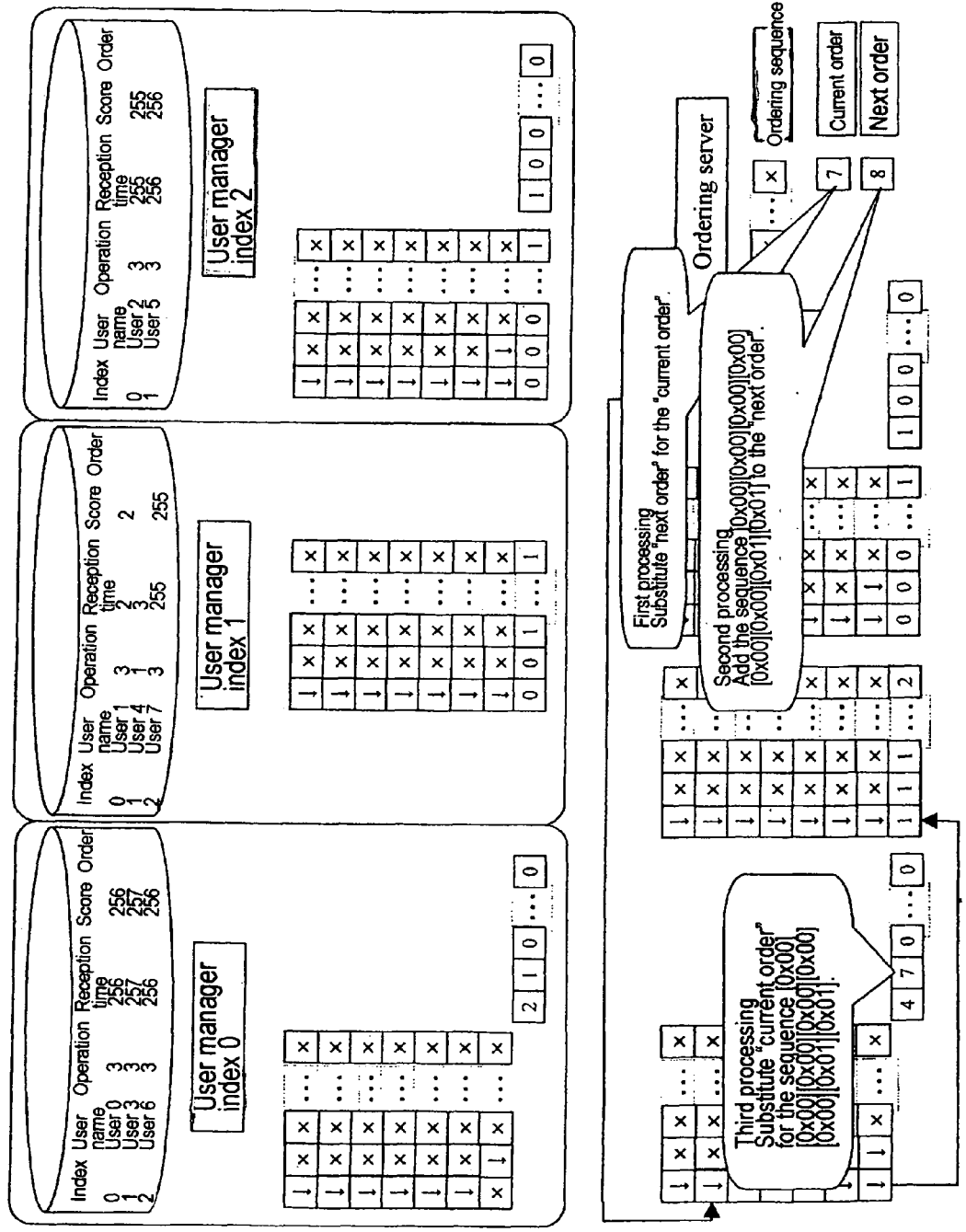
FIG. 25 is Explanatory Diagram 6, which shows a processing example for S55 to S59 in FIG. 8.
Figure 26:
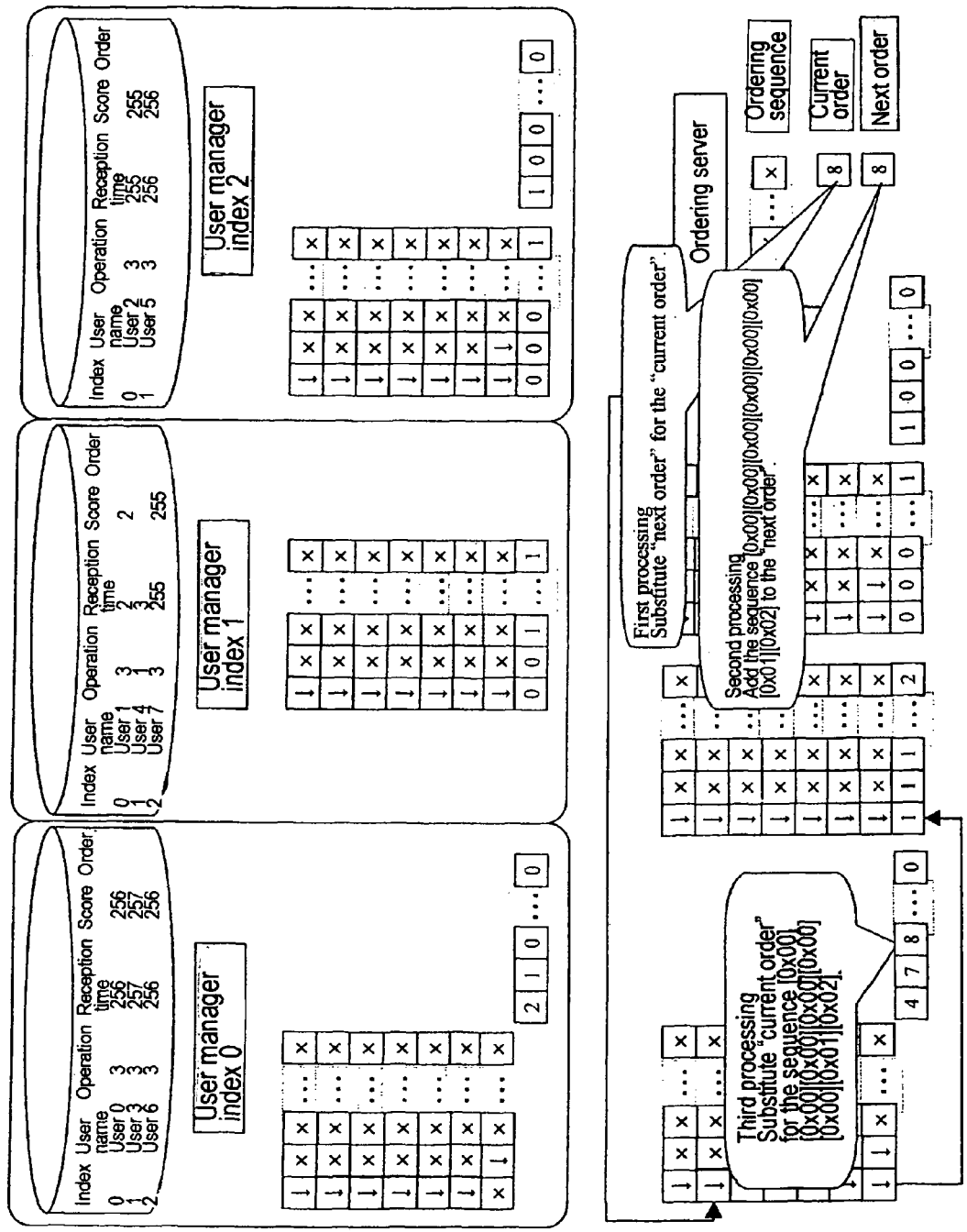
FIG. 26 is Explanatory Diagram 7, which shows a processing example for S55 to S59 in FIG. 8.

FIG. 17 is an explanatory diagram that shows a processing example for S50 and S51. In addition, FIG. 18 and FIG. 19 are explanatory diagrams that show a processing example of S52 and S53. When the sequences are being synthesized, the values of the other numerical units at the same score position are added to the numerical unit of the user administration server whose index is youngest among the numerical data units that are present in the sequences collected, and if the index in the sequence that the pointer to this numerical unit has collected has not been registered in the youngest sequence, it is synthesized by registering it. In FIG. 18 and FIG. 19, there is no numerical unit with the highest ranking in the sequence of the index 0, so the numerical unit of index 1 is registered in the sequence of index 0, and the data of the 255 address of the numerical unit of the same score position of index 2 is added. Moreover, the data of the 0 address of the numerical unit of the same score position of index 2 is added to the numerical unit of the next ranking. A new sequence may be produced, and all the numerical data of the sequence that is received may be added to the same score position of the new sequence.

Figure 27:
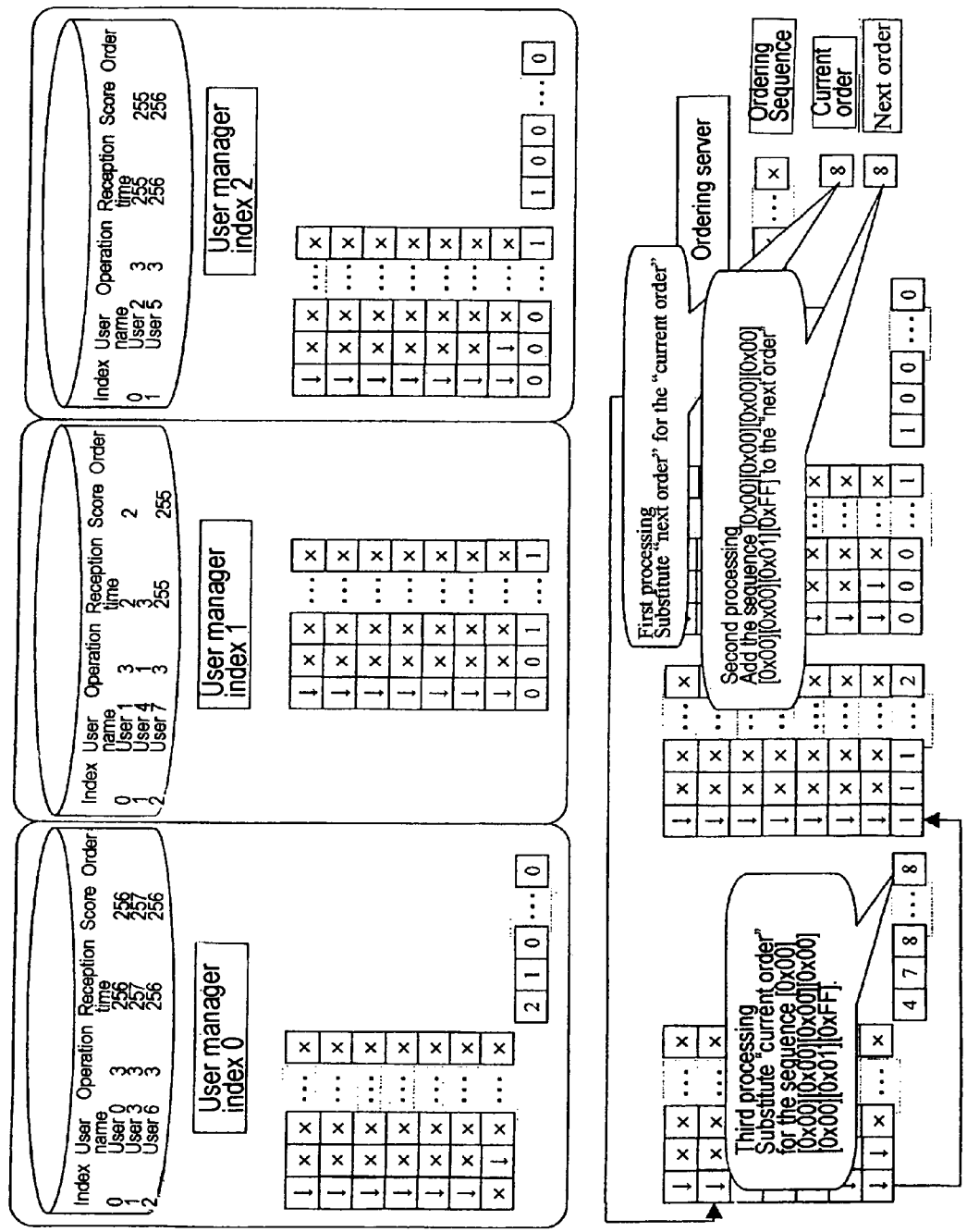
FIG. 27 is Explanatory Diagram 8, which shows a processing example for S55 to S59 in FIG. 8.

FIG. 20 to FIG. 27 are explanatory diagrams that show a processing example for S55 to S59. In the figures, the first processing is the processing at S55, the second processing is the processing at S56, and the third processing is the processing at S57. In addition, while moving from FIG. 20 to FIG. 21 and from FIG. 21 to FIG. 22, the target sequence position has 1 added thereto. FIG. 27 shows a state where the ordering processing is finished, and numerical values of 1 to 8 that show the ranking have been set for the numerical units that are linked by the pointer.

In the user administration servers, the order sequence is inputted at S70. At S71, the information sequence of the nth user is acquired. At S72, the order data is acquired from the order sequence based on the score information for correct respondents, and is written into the user information sequence. At S73, a determination is made about whether or not the ordering processing for all users is finished, and when the determination result is negative it moves to S71, but when it is positive the processing is concluded. By means of the above-described processing, the ranking is written into the user information of each user administration server.

Figure 28:
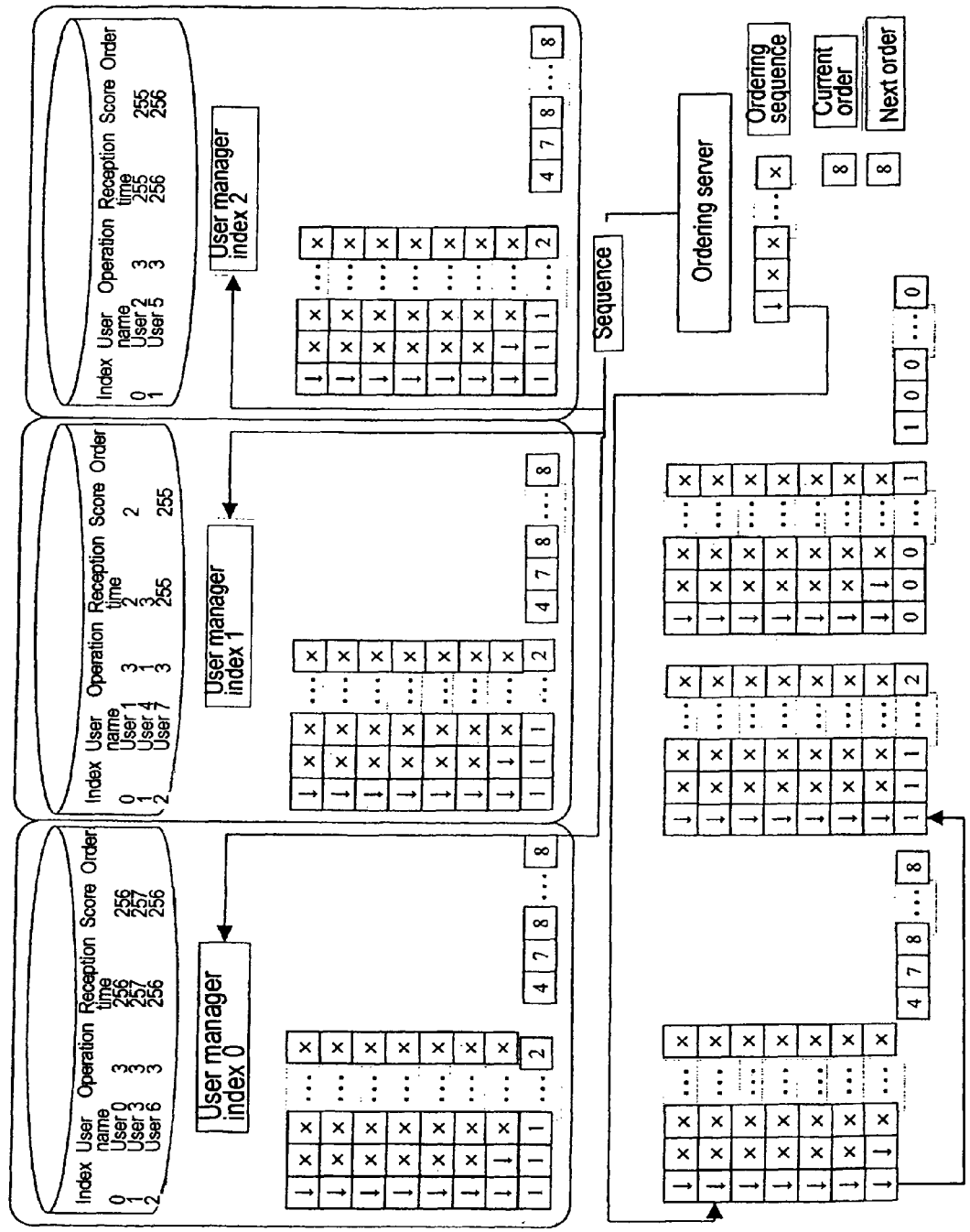
FIG. 28 is an explanatory diagram that shows a processing example for S70 in FIG. 8.
Figure 29:
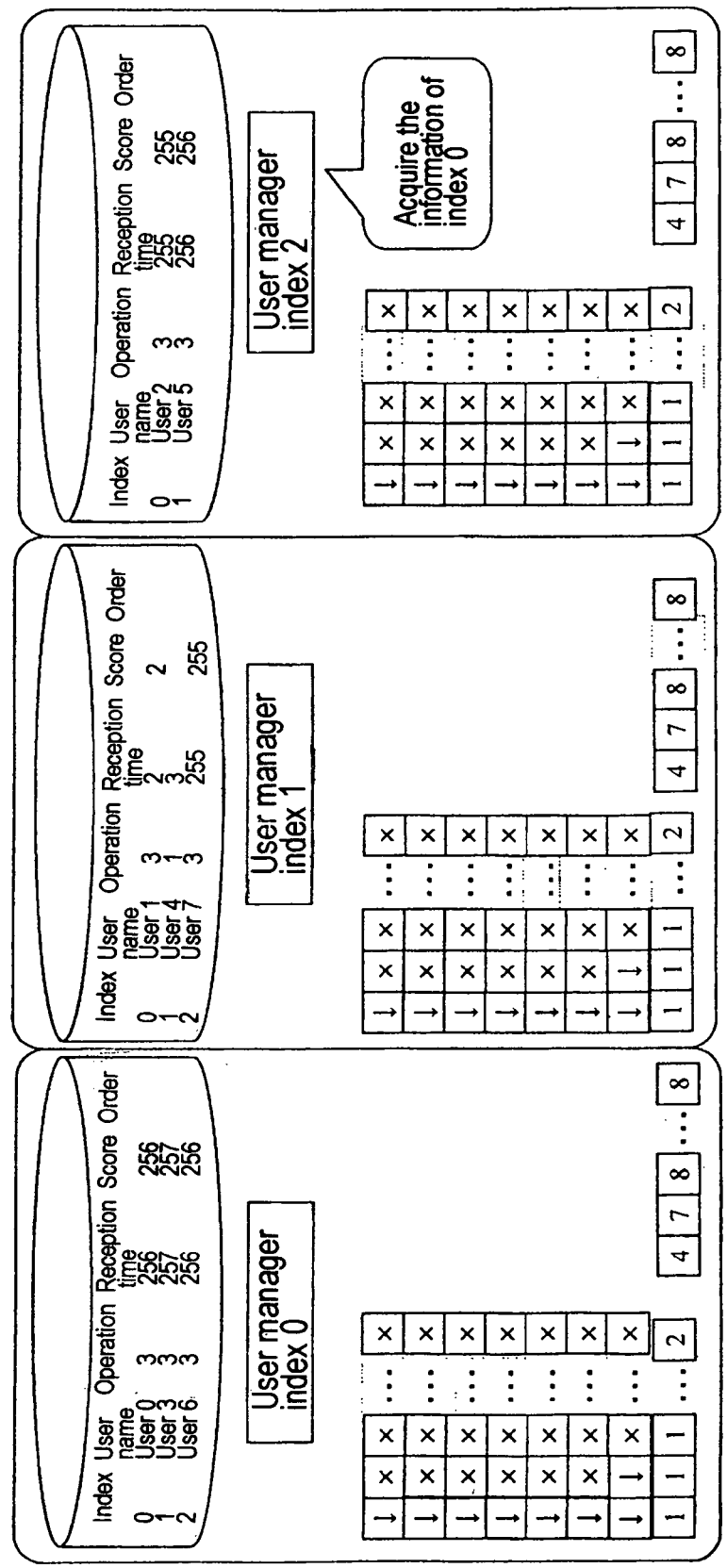
FIG. 29 is an explanatory diagram that shows a processing example for S71 in FIG. 8.
Figure 30:
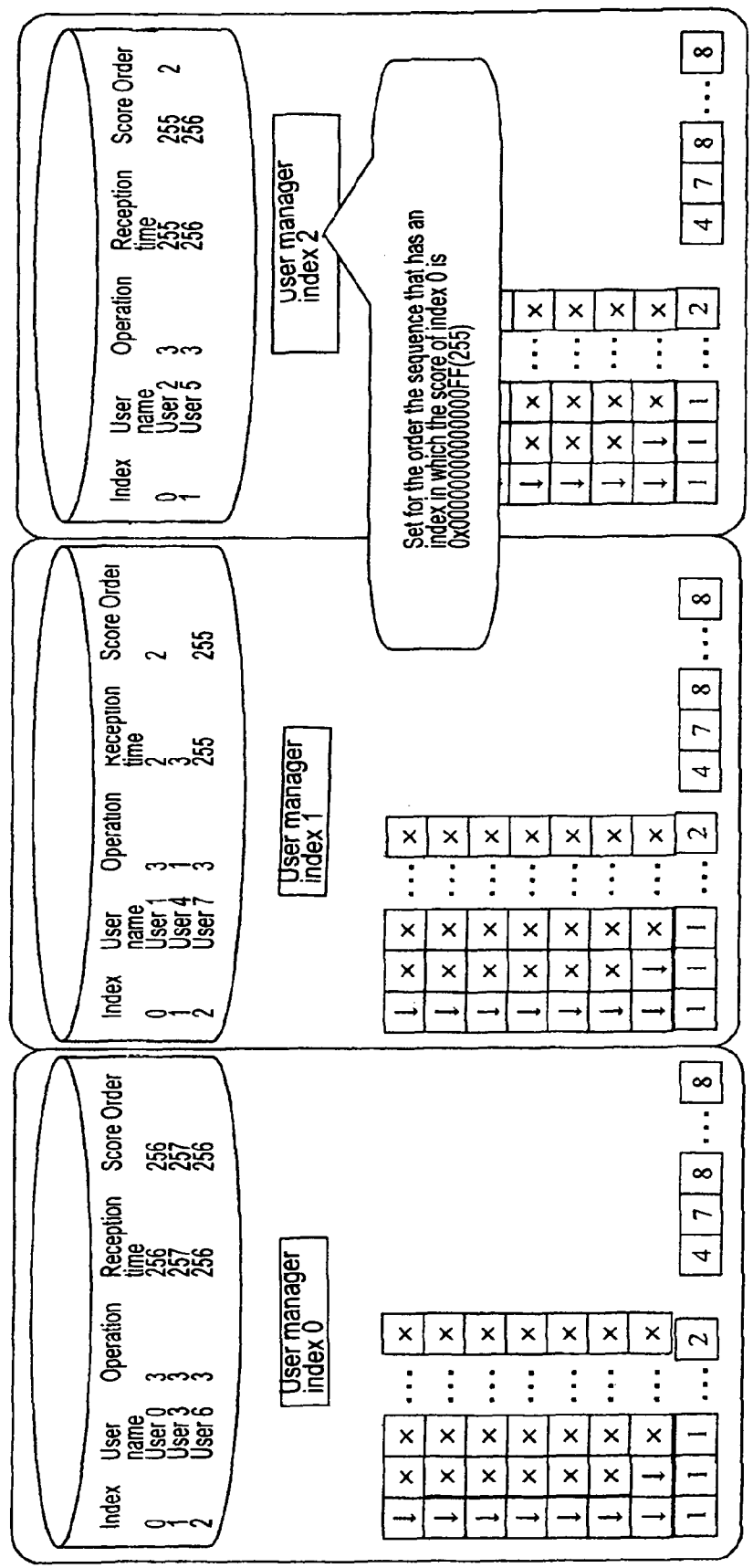
FIG. 30 is an explanatory diagram that shows a processing example for S72 in FIG. 8.
Figure 31:
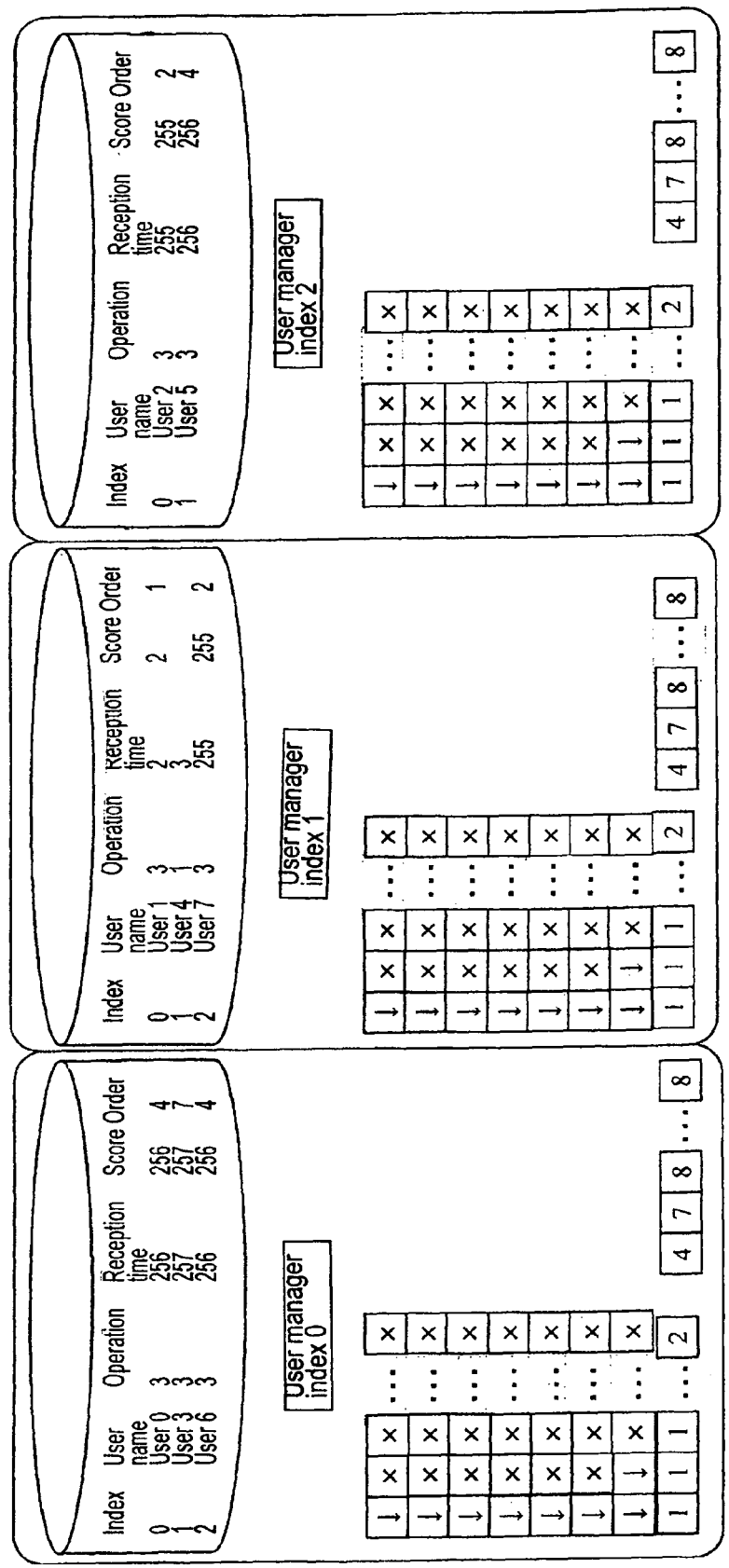
FIG. 31 is an explanatory diagram that shows a state where the ordering processing is completed.

FIG. 28 is an explanatory diagram that shows a processing example for S70. FIG. 29 is an explanatory diagram that shows a processing example for S71. In this example, the information of user 2 (index 0) is acquired. FIG. 30 is an explanatory diagram that shows a processing example for S72. In this example, the ordering sequence is followed based on the score (255) of user 2, and is set in the user information sequence. FIG. 31 is an explanatory diagram that shows a state where the ordering processing is finished at all the user administration servers.

Embodiment 2

Next, an explanation is provided about Embodiment 2. In Embodiment 1 the ordering server carries out the production of order data, but it is necessary to collect the data of all user administration servers 43 in the ordering server 53 to carry out the synthesis of the passing sequence, and there is a chance that this will result in a bottleneck in processing. In addition, during the processing of the ordering server the user administration server 43 is not processing when the result is being awaited. Accordingly, in Embodiment 2, the system has been configured so that the processing ability can be easily expanded, by distributing the additive synthesis or processing for producing order data to a plurality of user administration servers 43.

Figure 32:
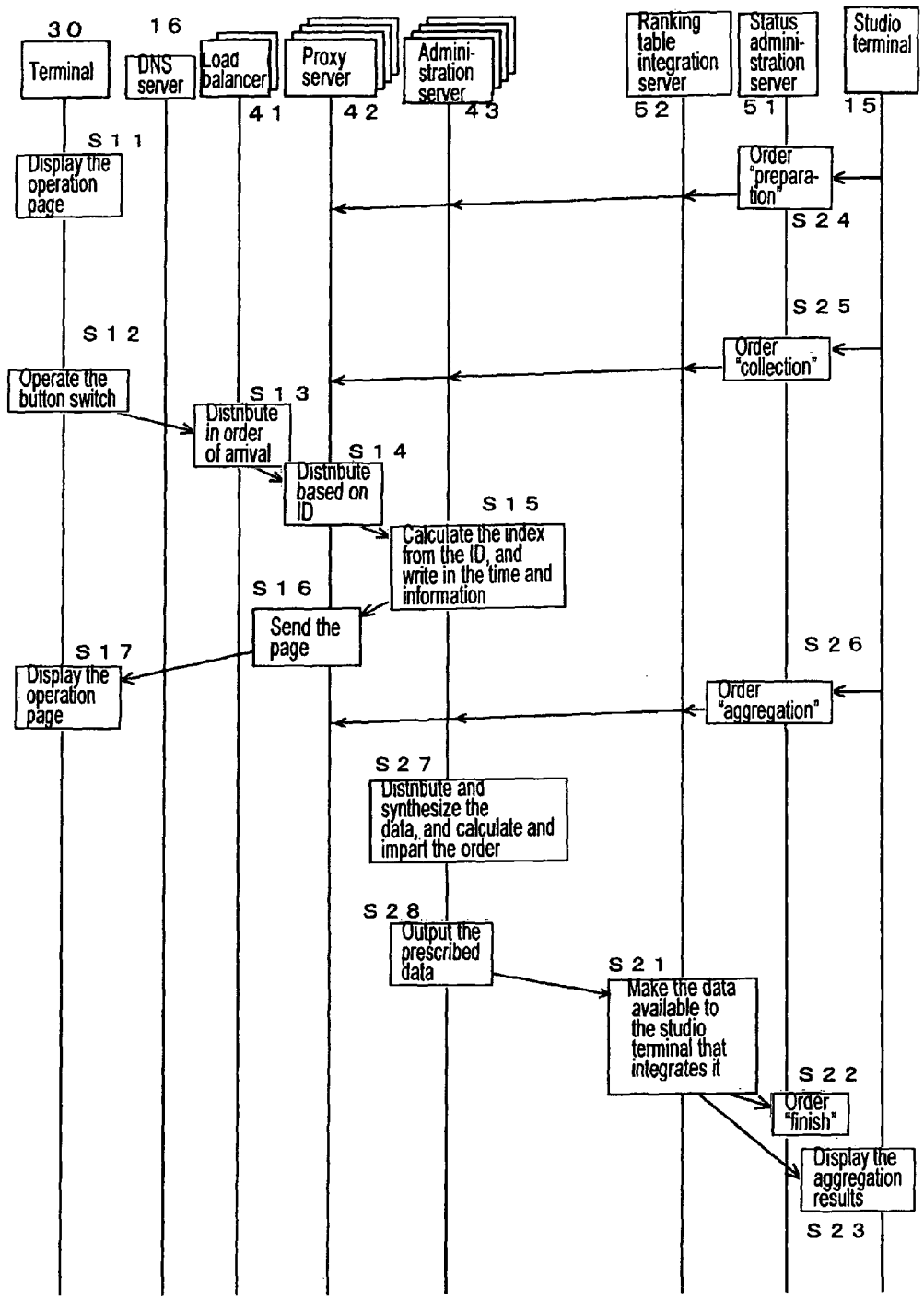
FIG. 32 is a flow chart that shows the exchange between each apparatus in Embodiment 2 of the present invention.

FIG. 32 is a flow chart that shows the exchanges between each apparatus of Embodiment 2 of the present invention. In Embodiment 2, no ordering server is provided, and order data is produced at the user administration servers 43. The only point on which it differs from Embodiment 1 is S27.

Figure 33:
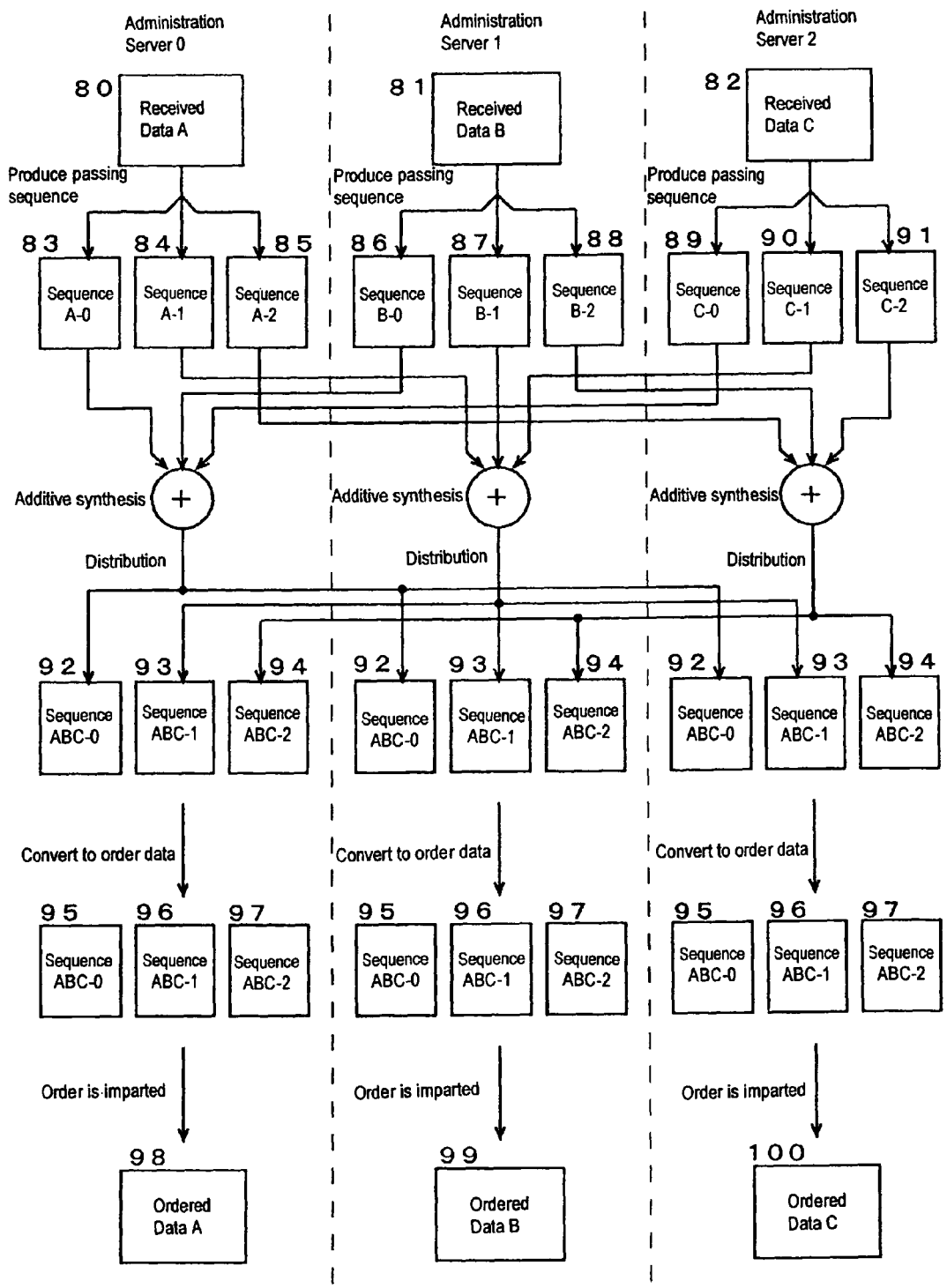
FIG. 33 is an explanatory diagram that shows the aggregation/ordering processing of Embodiment 2 of the present invention.

FIG. 33 is an explanatory diagram that shows the aggregation/ordering processing for S27 in Embodiment 2 of the present invention. The number of user administration servers is set for example at three in Embodiment 2, but this number can be increased or decreased as one wishes. The received data 80 to 82, which is the user information whereby the operation information of the users is stored, is present respectively in the user administration servers 0 (80) to 2 (82). In each user administration server, this received data is split up and passing sequences for the number of administration servers are produced. The structure of this sequence is the same as that shown in FIG. 7. It is distributed based on the lowest value of the scores in order to equalize the amount of data of each sequence (see below for the specifics).

In each user administration server, the passing sequence that the server in question is supposed to synthesize is obtained from another server, and the passing sequence to be synthesized with another server is delivered to another server. For example, user administration server 0 (80) delivers two sequences 84 and 85 out of the three sequences 83 to 85 produced, and acquires two sequences B-0 (86) and C-0 (89) from the other user administration servers 1 and 2.

When the passing sequences to be synthesized by the server in question is complete, additive synthesis is done for the sequence. For example, user administration server 0 (80) performs additive synthesis for the sequence ABC-0 (92) from the three sequences A-0 (83), B-0 (86) and C-0 (89). Since the additive synthesis is processed by distributing with a plurality of servers, the processing ability can be easily expanded by increasing or decreasing the number of servers.

The additively synthesized sequences are delivered to all the other user administration servers. Therefore, at the point in time when the delivery is finished at all the user administration servers, all the user administration servers retain the same additively synthesized sequences ABC-0 (92), ABC-1 (93) and ABC-2 (94).

The head-count data for each score (elapsed time) is stored in the additively synthesized sequences. Next, this head-count data is integrated from the start and converted into the order data ABC-0 (95), ABC-1 (96) and ABC-2 (97). This processing is carried out in parallel at each user administration server. It may be converted into order data at one user administration server, and the results thereof delivered to all the user administration servers, but the time required for the ordering is more or less the same.

Owing to the above processing, the same sequences ABC-0 (95), ABC-1 (96) and ABC-2 (97) wherein the order data is stored are retained at each user administration server. Finally, by referencing this order data, an order is imparted to the user information (received data) that each user administration server is administering.

Figure 34:
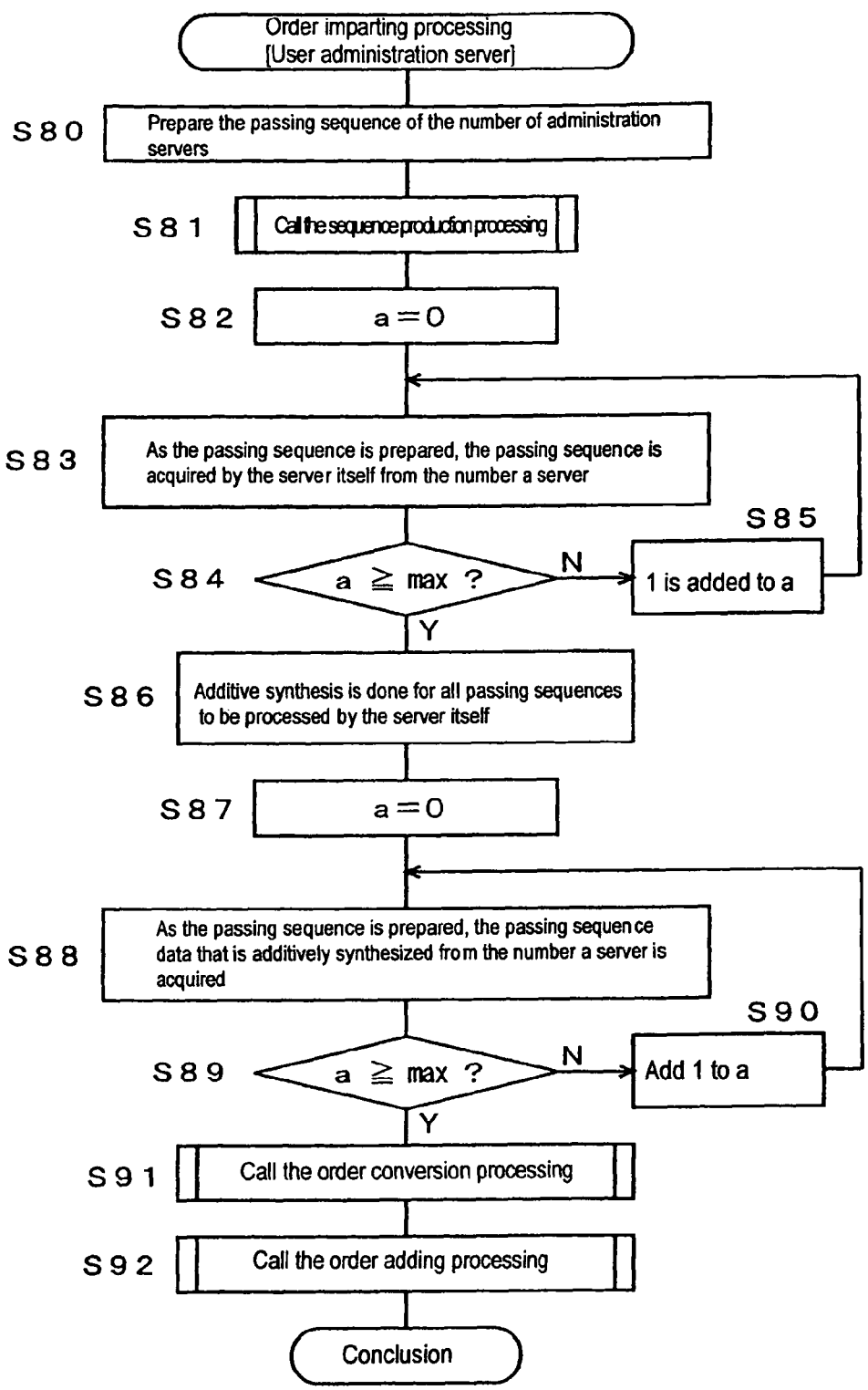
FIG. 34 is a flow chart that shows the order imparting processing of Embodiment 2 of the present invention.

FIG. 34 is a flow chart that shows the order imparting processing for S27 in Embodiment 2 of the present invention. This processing is activated respectively at each user administration server 43 by the aggregation instruction from the status administration server 51. At S80, passing sequences for the number of user administration servers are prepared, and at S81, the sequence production processing described below is called. Here passing sequences for the number of user administration servers are produced.

At S82, 0 is substituted for variable a. At S83, as the passing sequence data is prepared, the passing sequence data that is added with the server itself from the number a server is acquired. At S84, a determination is made about whether or not a is the maximum or above of the number of user administration servers, and when the determination result is negative it moves to S85, and when it is positive it moves to S86. At S85, 1 is added to a and it moves to S83. At S86, additive synthesis is done for the contents of all the passing sequences that are to be processed by the server itself. The synthesis method is the same as the processing at S52 and S53 in Embodiment 1.

At S87, 0 is substituted for variable a. At S88, as the passing sequence data is prepared, the passing sequence data that is added from the number a server is acquired. At S89, a determination is made about whether or not a is the maximum or above of the number of administration servers, and when the determination result is negative it moves to S90, and when it is positive it moves to S91. At S90, 1 is added to a and it moves to S88. By the above-mentioned processing, all the user administration servers assume a state in which they retain the same additively synthesized sequence.

At S91, order conversion processing is called. Due to this processing, the head-count data in the sequence is integrated converted into order data. At S92, the order adding processing is called. Due to this processing, an order is imparted to the user information (received data) that each user administration server is administering.

Figure 35:
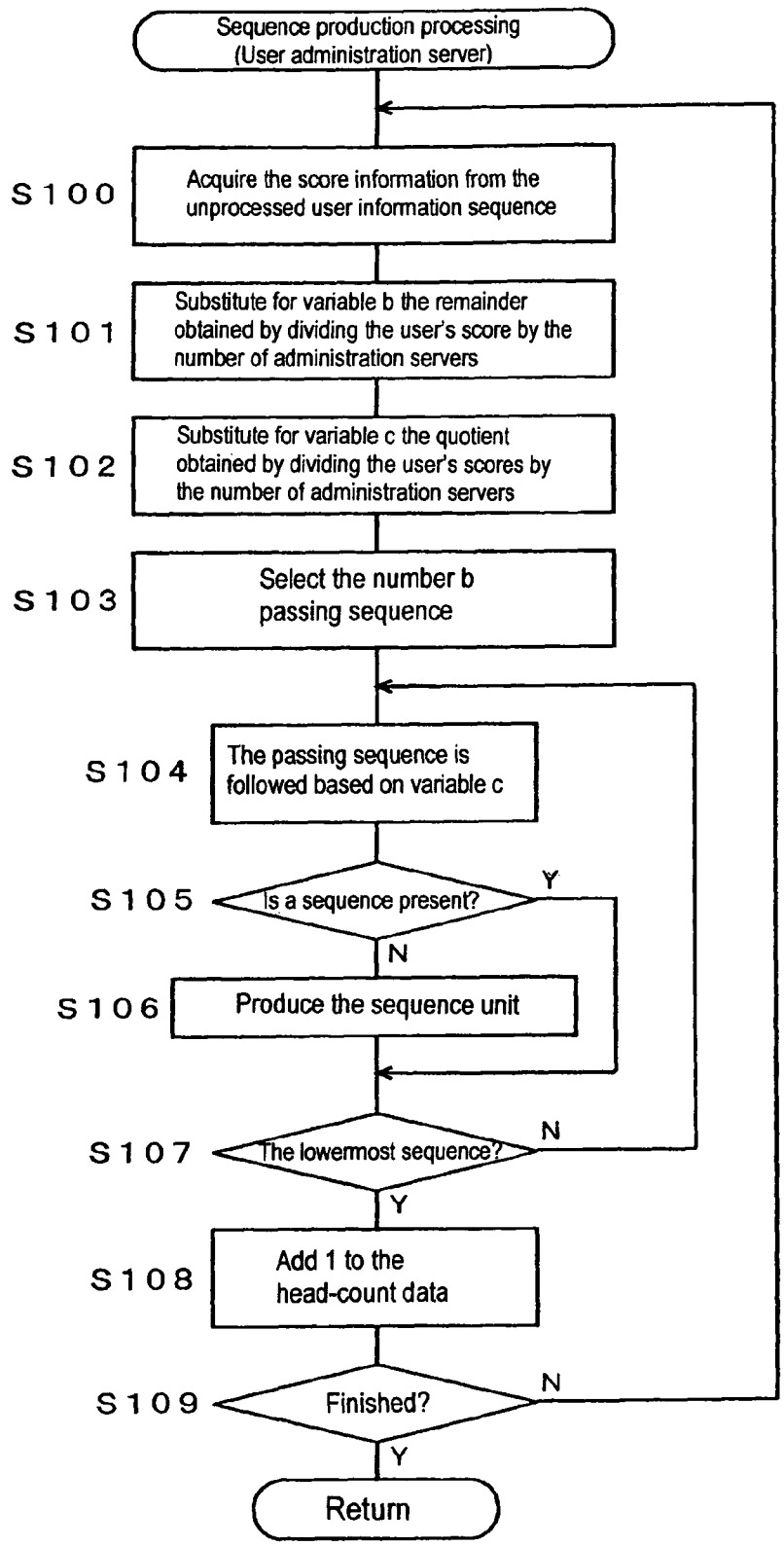
FIG. 35 is a flow chart that shows the sequence production processing of Embodiment 2 of the present invention.

FIG. 35 is a flow chart that shows the contents of the sequence production processing (S81) of Embodiment 2 of the present invention. This processing produces a passing sequence of the user information that is split up for the number of user administration servers. At S100, the score information is calculated from the unprocessed user information (received data), and is moreover written into the user information. At S101, the remainder obtained by dividing the scores of the users by a number of administration servers that is set beforehand is substituted for variable b. At S102, the quotient obtained by dividing the scores of users by the number of administration servers is substituted for variable c.

At S103, the number b passing sequence is selected. At S104, the passing sequence is followed in order from the top based on the value of variable c. Concretely, c is partitioned into a number of levels for each bit number (for example, 8 bits) corresponding to the level, and a check is made about whether or not a valid pointer that indicates the lower sequence unit is present in the address that corresponds to the value that partitions the c inside the sequence unit from the top level.

At S105, a determination is made about whether or not a lower sequence is present, and if the determination result is negative it moves to S106, but if it is positive it moves to S107. At S106, a lower sequence unit and a pointer that indicates this are newly produced. At S107, a determination is made about whether or not this is the lowermost sequence, and if the determination result is negative it moves to S104, but if it is positive it moves to S108.

At S108, 1 is added to the head-count data that corresponds to the lower prescribed bit of c in the lowermost sequence unit. At S109, a determination is made about whether or not it is finished, and if the determination result is negative it moves to S100, but if it is positive the processing is concluded. By means of the above-mentioned processing, a passing sequence that is split up into the number of user administration servers is produced. Since the amount of information of each sequence is distributed based on the lower value (b) of the score information, the head-count information contained in each sequence is more or less equal, and it can be anticipated that the load of additive synthesis processing is more or less equal at each user administration server.

Figure 36:
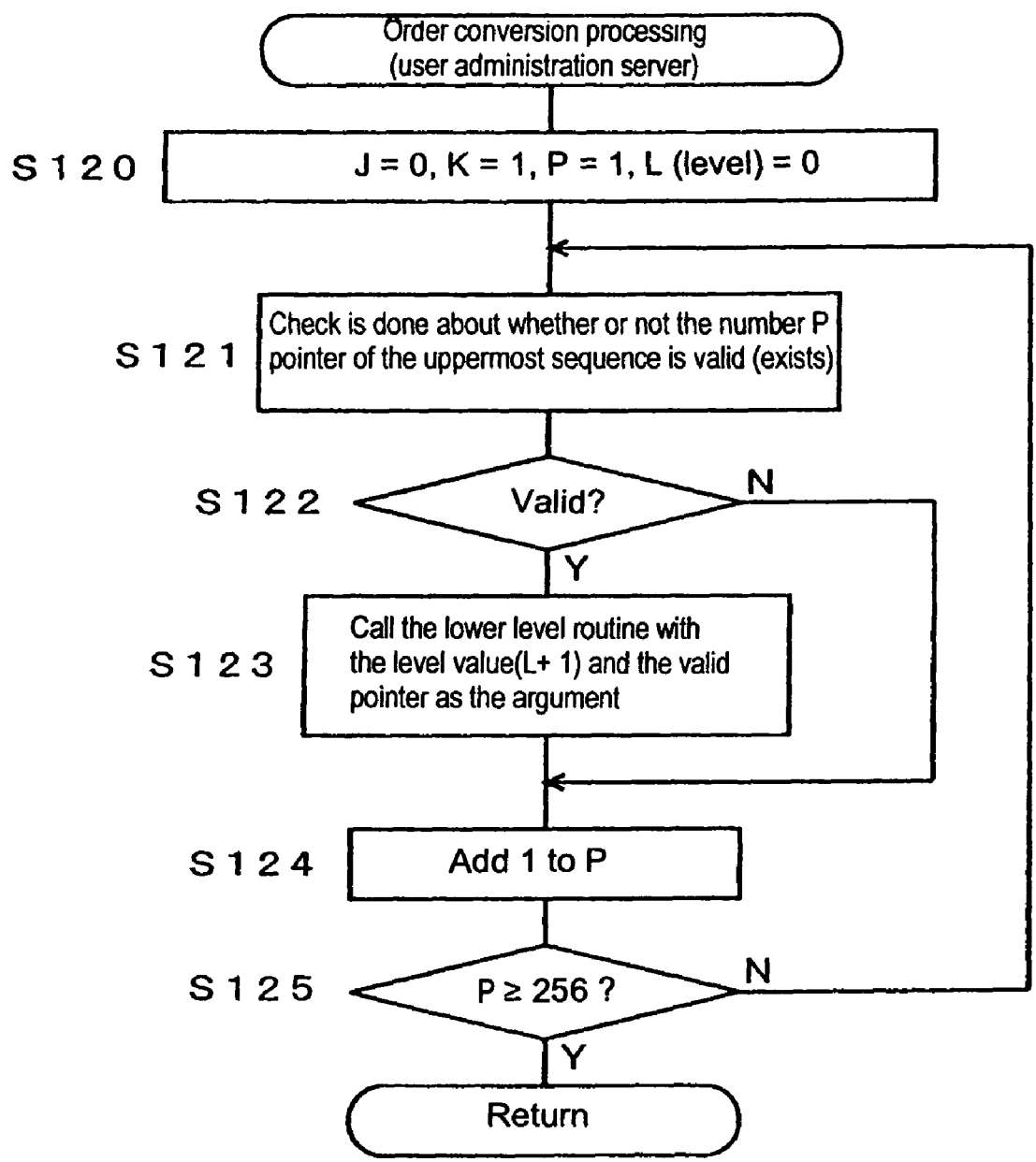
FIG. 36 is a flow chart that shows the order conversion processing of Embodiment 2 of the present invention.

FIG. 36 is a flow chart that shows the contents of the order conversion processing (S91) of Embodiment 2 of the present invention. At S120, initialization of the variable, etc. (the temporarily retained variable of the head-count data)=0, K (order data)=1, P (the counter used for sequence scanning of the uppermost level)=0 and L (level) are carried out. At S121, a check is done about whether or not the number P pointer of the uppermost sequence unit is valid (exists). At S122, determination is made about whether or not it is valid, and if the determination result is negative it moves to S124, but if it is positive it moves to S123.

At S123, the lower level routine (call-out) is called with the layer value (L+1) and the pointer that is valid at S121 as the argument. At S124, 1 is added to P. At S125, a determination is made about whether or not P is 256 and above, and if the determination result is negative it moves to S121, but if it is positive the processing is concluded.

Figure 37:
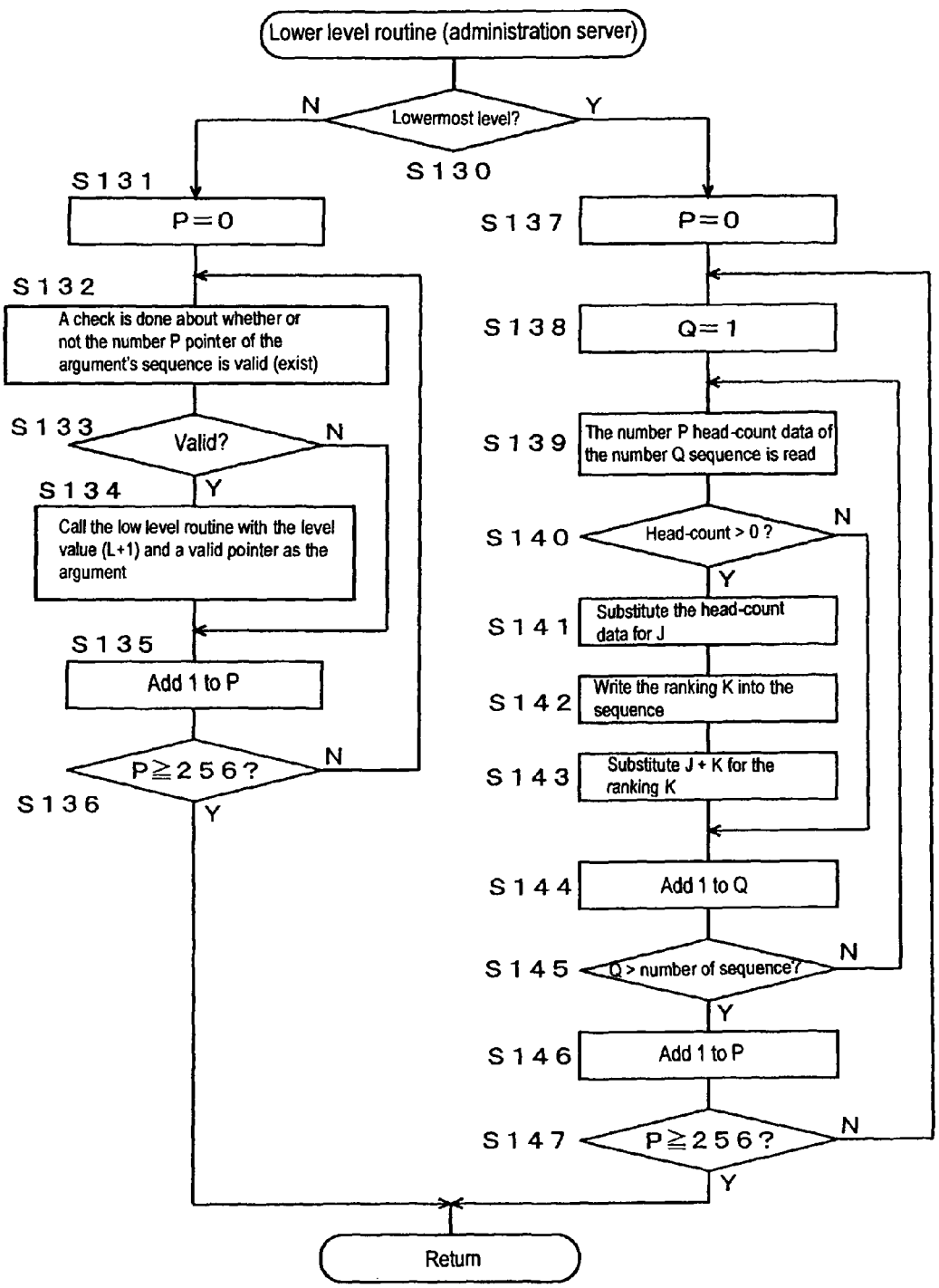
FIG. 37 is a flow chart that shows the lower level routine of Embodiment 2.

FIG. 37 is a flow chart that shows the lower level routine of Embodiment 2. This processing routine is recurrently called out for each level, but the variables used by the routine are independent at the respective levels. In addition, the processing at the lowermost level and the processing at the intermediate levels are separated. At S130, a determination is made about whether it is the lowermost level, and when the determination result is negative it moves to S131, but when it is positive it moves to S137.

S131 to S136 (L=1 to 6) is the processing at the intermediate levels. At S131, initialization to P=0 is done. At S132, a check is made about whether or not the number P pointer of the sequence unit designated by the argument from the upper routine is valid (exists). At S133, a determination is made about whether it is valid, and when the determination result is negative it moves to S135, but when it is positive it moves to S134.

At S134, the lower level routine (call-out) is called with the layer value (L+1) and the pointer that is valid at S122 as the argument. At S135, 1 is added to P. At S136, a determination is made about whether P is 256 and above, and when the determination result is negative it moves to S132, but when it is positive the processing is concluded and it returns to the original routine.

S137 to S147 (L=7) is the processing at the lowermost level. At S137, initialization to P=0 is done. At S138, the counter Q of the number of valid sequences that are passed over from the upper routine is initialized to 1. At S139, the number P head-count data of the number Q sequence unit is read.

At S140, a determination is made about whether the head-count is 1 and above, and when the determination result is negative it moves to S144, but when it is positive it moves to S141. At S141, the head-count data is substituted for variable J so that it is temporarily retained. At S142, the ranking K is written into number P of the number Q sequence unit. At S143, J+K are substituted for the ranking K and the ranking is updated.

At S144, 1 is added to Q. At S145, a determination is made about whether Q is larger than the number of valid sequences passed on from the upper routine, and when the determination result is negative it moves to S139, but when it is positive it moves to S146. At S146, 1 is added to P. At S147, a determination is made about whether P is 256 and above, and when the determination result is negative it moves to S138, but when it is positive the processing is concluded and it returns to the original routine. By means of the above-mentioned processing, the head-count data inside each sequence is converted into order data.

Figure 38:
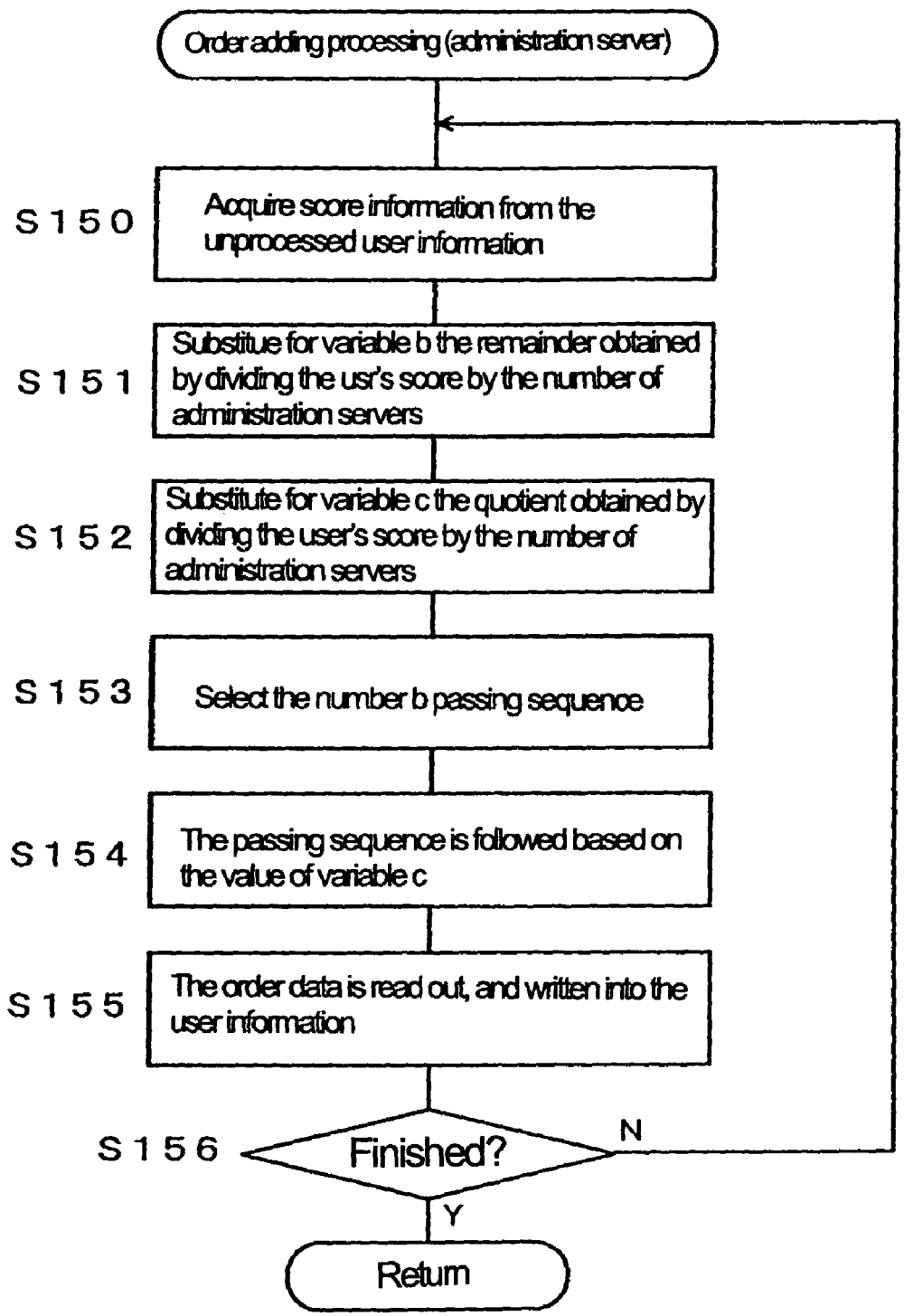
FIG. 38 is a flow chart that shows the order attached processing of Embodiment 2 of the present invention.

FIG. 38 is a flow chart that shows the contents of the ordering processing (S92) of Embodiment 2 of the present invention. At S150, the unprocessed score information is acquired from the user information sequence. At S151, the remainder obtained by dividing the scores of users by the number of administration servers is substituted for variable b. At S152, the quotient obtained by dividing the scores of users by the number of administration servers is substituted for variable c. At S153, the number b passing sequence is selected.

At S154, the passing sequence is followed in order from the top based on the value of variable c. At S155, the order data is read out from the lowermost sequence unit based on the value of variable c, and is written into the user information to which it applies. At S156, a determination is made about whether it is finished, and when the determination result is negative it moves to S150, but when it is positive the processing is concluded and it returns to the original routine.

Embodiments were disclosed above, but the following kinds of modifications can be imagined. In the embodiments, examples in which a portable terminal is used were disclosed, but it is also possible to use a general PC terminal that is connected to the Internet. In that case, the system may, for example, be configured so that it allocates to a plurality of user administration servers in the order of reception to the registration server.

Examples where an order is imparted taking the time up to operation as the score have been disclosed as the embodiments, but below there is disclosed a more effective method for using the passing sequences of the present invention. In this example, a user with more correct answers is ranked at a higher level by one ordering processing, and in the event that there is a tie for the number of correct answers, ranking is done so that the user with the shorter mean time for a correct answer is ranked higher.

For example, when contestant A has three correct answers and a mean time for a correct answer of 13 seconds, contestant B has two correct answers and a mean time for a correct answer of 13 seconds and contestant C has two correct answers and a mean time for a correct answer of 5 seconds, the scores are calculated for example by the following formula.

Score=(0xFFFFFFFFFFFFFFFF−number of correct answers*0x00000000+mean time for a correct answer)

The meaning of this formula is the maximum number that can be sequentially expressed−the number of correct answers at the left, and half (32-bit) shift of the maximum number that can be sequentially expressed+the mean time for a correct answer.

Contestant A: 0xFFFFFFFFFFFFFFFF−
0x300000000+0xD=0xFFFFFFFD00000000C

Contestant B: 0xFFFFFFFFFFFFFFFF−
0x200000000+0xD=0xFFFFFFFE00000000C

Contestant C: 0xFFFFFFFFFFFFFFFF−
0x200000000+0x5=0xFFFFFFFE000000004

Since the order is set in order of the smallest values in the system for the present invention, contestant A is in first place, contestant B is in third place and contestant C is in second place.

In this manner, it is possible to make operation information, accumulated information, the data for reception time, etc. correspond to various kinds of ordering, with bit shifts and replacements and combinations of plus and minus. Then, in this example, the passing sequence can express data by using only 13 digits for the 2 sequences below 0xFFFFFF (the upper three levels) and one sequence each with a total of 256 parameters below that. That is, the passing sequence of the present invention has the feature that the best data compression effects appear when a large number of values that are proximate to one another are present.

In this example, it fits in a range where the number of seconds is 0 to 255 (0xFF) with the number of correct answers being 1 to 10 (0xA), and the sequence of each level even if information for 1.0 billion people is present is 1+1+1+0xA+0xA+0xA+0xA+0xA=53, and this requires only a maximum of approximately 52 Kbytes at 53*256*4 bytes (the general size of one parameter). In addition, in the case of a relatively broad range of values where the number of seconds is 0 to 65,535 (0xFFFF) with the number of correct answers being 1 to 100 (0x64), it is 1+1+1+0x64+0x64=0x64+0x64+(0x64*0xFF)=26,003, and this requires only a maximum of approximately 26 Mbytes. In reality, a peak (bias) appears in the number of correct answers and mean time for a correct response, so the amount of data becomes even smaller. Thus, the system has the characteristic that effects are generated even for heavily biased scores.

In the embodiments, examples are disclosed where processing is done after button information is received, with the operation of the button by the user being the trigger, but the present invention can be applied to the following kinds of trigger and combinations of information, and flexible information collection is possible thereby. One can imagine, for example, the following methods (triggers) for generating the operation information.

(1) An operation trigger, (2) operation of 0 to 9 (a ten-key, etc.), (3) operation of 1 to 12 (a remote control device for a television, etc.), (4) operation of various other kinds of buttons (color, shape, etc.), (5) operation by selection (a list, etc.), (6) changes in brightness (light sensor, etc.), (7) changes in atmospheric temperature (thermometer), (8) changes in atmospheric pressure (barometer), (9) changes in speed (speedometer, gyro sensor, etc.), (10) changes in acceleration (gyro sensor, etc.), (11) changes in time (clock, GPS, etc.), (12) changes in position (GPS, etc.), (13) changes in height (GPS, etc.), (14) changes in sensation (brain waves, etc.), (15) changes in behavior (movements like gestures, etc.), (16) other things where it is possible to determine changes.

In addition, the following kinds of information are considered to be operation information. (1) Number information, (2) character information, (3) selector information, (4) brightness information, (5) atmospheric temperature information, (6) atmospheric pressure information, (7) speed information, (8) acceleration information, (9) time information, (10) position information, (11) height information, (12) sensory information, (13) behavioral information.

The system for the present invention can be applied for use in a system that is needed to execute ordering processing in a short period, such as a system that aggregates the response information operated by users in conjunction with viewer participation programs for television, and reflect this in the program. Moreover, the order imparting system of the present invention is not limited to systems that act in conjunction with television programs, and can be applied to whatever system one wishes when a large amount of access is concentrated in a limited time period, and it is necessary to order this, such as ticket sales, odds calculation for gambling and sports matches, and auctions ranking of network participation games.

The disclosure of Japanese Patent Applications No. 2003-379466, filed on Nov. 10, 2003, and No. 2003-379467, filed on Nov. 10, 2003, are incorporated in the application.

While the invention has been explained with reference to the specific embodiments of the invention, the explanation is illustrative and the invention is limited only by the appended claims.

What is claimed is:
1. An aggregation system, comprising:
a load balancer;
a plurality of user proxy server devices; and
a plurality of user administration server devices;
the plurality of user proxy server devices being connected with the load balancer so that the load balancer distributes access requests from user terminals in order of receipt to arbitrary ones of the plurality of user proxy server devices, and so that each access request is sent through a communication network from the user terminals and respectively includes a predetermined user identification number, and operation information which is generated by the user terminals,
the plurality of user proxy server devices comprising a plurality of first computers each respectively connected to the load balancer by a Local Area Network (LAN), wherein the plurality of first computers each respectively includes a memory and a program stored thereon to:

identify, among the user administration server devices, a user administration server device where a device number M of the identified user administration server device corresponds to a remainder obtained by dividing the user identification number in an access request received through the load balancer by a total number N of the user administration server devices, and transfer the access request, including the operation information and the user identification number, to the identified user administration server device; and wherein the plurality of user administration server devices comprises a plurality of second computers which each is respectively connected to the plurality of user proxy server devices by the LAN, and to which the device numbers of the user administration server devices are assigned, the plurality of second computers each respectively includes a memory, and a program stored thereon to generate a unique terminal identification number for each user terminal and inform said each terminal of said unique terminal identification number, said unique terminal identification number being generated, in response to a registration request issued from the user terminal prior to issuing the access request, by using the total number N of the user administration server devices, the device number M of the identified user administration server device and a data sequence location I assigned to said each user terminal in a section of the memory, and wherein the unique terminal identification number=$I \times N + M$; and to store the operation information included in the access request together with time information relating to time elapsed from receiving the access request from the corresponding second computer, at a sequence location corresponding to a quotient in the memory, the quotient being obtained by dividing the user identification number included in the access request received from the user proxy server device by the total number N of the user administration server devices.

2. An aggregation system according to claim 1, wherein the program of the second computers sends information of completion of processing by the identified user administration server device to each user proxy server device when the processing by the identified user administration server device is completed, and wherein each user proxy server device further includes a program to send operation page information to the user terminals.

* * * * *